US008712810B2

(12) United States Patent
Meisels et al.

(10) Patent No.: US 8,712,810 B2
(45) Date of Patent: *Apr. 29, 2014

(54) RESERVING A TIME BLOCK IN A CALENDAR APPLICATION TO ACCOUNT FOR A TRAVEL TIME BETWEEN GEOGRAPHIC LOCATIONS OF APPOINTMENTS

(75) Inventors: Adrienne C. Meisels, New York, NY (US); Stephen J. Coughlin, Falls Church, VA (US); W. Karl Renner, Great Falls, VA (US)

(73) Assignee: Facebook, Inc., Menlo Park, CA (US)

( * ) Notice: Subject to any disclaimer, the term of this patent is extended or adjusted under 35 U.S.C. 154(b) by 1086 days.

This patent is subject to a terminal disclaimer.

(21) Appl. No.: 11/966,639

(22) Filed: Dec. 28, 2007

(65) Prior Publication Data

US 2008/0167938 A1 Jul. 10, 2008

Related U.S. Application Data

(63) Continuation-in-part of application No. 11/618,069, filed on Dec. 29, 2006, now Pat. No. 7,941,753.

(60) Provisional application No. 60/945,805, filed on Jun. 22, 2007, provisional application No. 60/888,850, filed on Feb. 8, 2007.

(51) Int. Cl.
*G06Q 10/00* (2012.01)

(52) U.S. Cl.
USPC ............................................................ 705/5

(58) Field of Classification Search
USPC .................................................. 705/1.1, 5, 6
See application file for complete search history.

(56) References Cited

U.S. PATENT DOCUMENTS

| | | | |
|---|---|---|---|
| 4,301,506 A | 11/1981 | Turco | |
| 4,393,448 A | 7/1983 | Dunn et al. | |
| 4,413,322 A | 11/1983 | Foster et al. | |
| 4,528,552 A | 7/1985 | Moriyama et al. | |
| 4,546,439 A | 10/1985 | Esparza | |
| 4,570,227 A | 2/1986 | Tachi et al. | |
| 4,646,089 A | 2/1987 | Takanabe et al. | |
| 4,689,747 A | 8/1987 | Kurose et al. | |
| 4,796,189 A | 1/1989 | Nakayama et al. | |

(Continued)

OTHER PUBLICATIONS

Snyder, John P., "Map Projections—A Working Manual"; U.S. Geological Survey Professional Paper; 1987; U.S. Department of Interior, 383 pages.

(Continued)

*Primary Examiner* — Shannon Campbell
(74) *Attorney, Agent, or Firm* — Keller Jolley Preece

(57) ABSTRACT

Techniques are described for accounting for travel time in scheduling appointments in an electronic calendar. For example, a travel time between appointments may be identified and a time block may be reserved on a calendar application to account for such travel time. Geographic locations of adjacent appointments in a calendar may be determined and a route between the geographic locations also may be determined. A travel time associated with traveling the route between the geographic locations may be computed and the computed travel time may be compared to unscheduled time between the adjacent appointments in the calendar to determine whether the unscheduled time exceeds the travel time. If it is determined that the unscheduled time exceeds the travel time, a time block may be reserved on the calendar application to account for the travel time.

22 Claims, 22 Drawing Sheets

(56) References Cited

U.S. PATENT DOCUMENTS

| | | | |
|---|---|---|---|
| 4,827,419 A | 5/1989 | Selby, III | |
| 4,866,626 A | 9/1989 | Egli | |
| 4,876,651 A | 10/1989 | Dawson et al. | |
| 4,890,104 A | 12/1989 | Takanabe et al. | |
| 4,914,605 A | 4/1990 | Loughmiller, Jr. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,984,168 A | 1/1991 | Neukrichner et al. | |
| 5,031,104 A | 7/1991 | Ikeda et al. | |
| 5,041,983 A | 8/1991 | Nakahara et al. | |
| 5,067,081 A | 11/1991 | Person | |
| 5,115,399 A | 5/1992 | Nimura et al. | |
| 5,121,326 A | 6/1992 | Moroto et al. | |
| 5,168,452 A | 12/1992 | Yamada et al. | |
| 5,170,353 A | 12/1992 | Verstraete | |
| 5,172,321 A | 12/1992 | Ghaem et al. | |
| 5,189,430 A | 2/1993 | Yano et al. | |
| 5,191,406 A | 3/1993 | Brandestini et al. | |
| 5,191,532 A | 3/1993 | Moroto et al. | |
| 5,231,584 A | 7/1993 | Nimura et al. | |
| 5,270,937 A | 12/1993 | Link et al. | |
| 5,272,638 A | 12/1993 | Martin et al. | |
| 5,274,387 A | 12/1993 | Kakihara et al. | |
| 5,293,163 A | 3/1994 | Kakihara et al. | |
| 5,353,034 A | 10/1994 | Sato et al. | |
| 5,442,557 A | 8/1995 | Kaneko | |
| 5,486,822 A | 1/1996 | Tenmoku et al. | |
| 5,557,524 A | 9/1996 | Maki | |
| 5,608,635 A | 3/1997 | Tamai | |
| 5,732,385 A | 3/1998 | Nakayama et al. | |
| 5,790,974 A * | 8/1998 | Tognazzini | 455/456.5 |
| 6,052,563 A | 4/2000 | Macko | |
| 6,282,489 B1 | 8/2001 | Bellesfield et al. | |
| 6,401,034 B1 | 6/2002 | Kaplan | |
| 6,498,982 B2 | 12/2002 | Bellesfield et al. | |
| 6,526,349 B2 | 2/2003 | Bullokc et al. | |
| 6,529,136 B2 * | 3/2003 | Cao et al. | 340/686.1 |
| 6,609,064 B1 | 8/2003 | Dean | |
| 6,678,613 B2 | 1/2004 | Andrews et al. | |
| 6,741,188 B1 | 5/2004 | Miller et al. | |
| 6,801,139 B2 | 10/2004 | Tretyak, Jr. | |
| 6,842,696 B2 | 1/2005 | Silvester | |
| 6,895,329 B1 | 5/2005 | Wolfson | |
| 6,920,384 B2 | 7/2005 | Shiimado | |
| 6,944,539 B2 | 9/2005 | Yamada et al. | |
| 6,958,692 B1 * | 10/2005 | Ratschunas | 340/539.13 |
| 6,993,430 B1 | 1/2006 | Bellesfield et al. | |
| 7,062,374 B1 | 6/2006 | Walters et al. | |
| 7,085,649 B2 * | 8/2006 | Baur et al. | 701/209 |
| 7,139,722 B2 | 11/2006 | Perrella et al. | |
| 7,313,767 B2 * | 12/2007 | Mak | 715/864 |
| 7,373,244 B2 | 5/2008 | Kreft | |
| 7,552,009 B2 * | 6/2009 | Nelson | 701/208 |
| 7,743,056 B2 | 6/2010 | Meisels et al. | |
| 7,869,941 B2 | 1/2011 | Coughlin et al. | |
| 7,925,525 B2 | 4/2011 | Chin | |
| 7,941,753 B2 | 5/2011 | Meisels et al. | |
| 8,073,614 B2 | 12/2011 | Coughlin et al. | |
| 2002/0019835 A1 | 2/2002 | Baur et al. | |
| 2002/0062236 A1 * | 5/2002 | Murashita et al. | 705/5 |
| 2002/0188603 A1 | 12/2002 | Baird et al. | |
| 2003/0001779 A1 | 1/2003 | Mintz et al. | |
| 2003/0036848 A1 | 2/2003 | Sheha et al. | |
| 2003/0191578 A1 | 10/2003 | Paulauskas et al. | |
| 2004/0158392 A1 | 8/2004 | Choi | |
| 2004/0260465 A1 | 12/2004 | Tu | |
| 2005/0015316 A1 * | 1/2005 | Salluzzo | 705/30 |
| 2005/0027705 A1 | 2/2005 | Sadri et al. | |
| 2005/0055353 A1 | 3/2005 | Marx et al. | |
| 2005/0075119 A1 | 4/2005 | Sheha et al. | |
| 2005/0096841 A1 | 5/2005 | Gedik et al. | |
| 2005/0096946 A1 | 5/2005 | Janakiraman et al. | |
| 2005/0119927 A1 * | 6/2005 | Patel | 705/8 |
| 2005/0165631 A1 | 7/2005 | Horvitz | |
| 2005/0227712 A1 | 10/2005 | Estevez et al. | |
| 2005/0228860 A1 | 10/2005 | Hamynen et al. | |
| 2006/0058952 A1 | 3/2006 | Cooper et al. | |
| 2006/0218029 A1 | 9/2006 | Chin | |
| 2007/0106458 A1 | 5/2007 | Iwami et al. | |
| 2008/0054072 A1 | 3/2008 | Katragadda et al. | |
| 2008/0059890 A1 * | 3/2008 | Zinn et al. | 715/751 |
| 2008/0167938 A1 | 7/2008 | Meisels et al. | |
| 2010/0241351 A1 | 9/2010 | Meisels et al. | |

OTHER PUBLICATIONS

Sherman, Chris, "Search Engine Watch: Google Launches Local for Mobile," reprinted on Sep. 11, 2006 from http://searchenginewatch.com/showPage.html?page=sew_print&id=3561956.

Guzolek, J., and Koch, E., "Real-time Route Planning in Road Networks," 1989 IEEE, pp. 165-169.

Pruitt, Scarlet, "MapQuest Goes Mobile," *PC World*, reprinted from http://www.pcworld.com/article/id,119161-page,1/article.html on Jul. 26, 2007, 3 pages.

"Yahoo! Mobile. The Internet Now Fits Your Phone," reprinted from heep://mobile.yahoo.com/;_ylt=AujFWTXXwBsSTR8Hk_P52L1bztAcJ on Jul. 26, 2007, 2 pages.

"Mobile Web Hop Online Anywhere on your Phone," reprinted from http://mobile.yahoo.com/mobileweb;_ylt=AvZP2FpcYsq1R9iZxOpUIUnntAcJ on Jul. 26, 2007, 3 pages.

"Yahoo! GO 2.0 Improved! The Internet to Go," reprinted from http://mobile.yahoo.com/go;_ylt=AqcFZ_48Qo6sCBg9mCOe6YktQcJ, on Jul. 26, 2007, 6 pages.

"MapQuest Help: What is Turn-by-Turn Navigation?," reprinted from http://help.mapquest.com/jive/entry.jspa?externalID=298&categoryIDS=35 on Jul. 26, 2007, 1 page.

Singh, Bhagat, and Naps, Thomas L., *Introduction to Data Structures*, "The Shortest Path Algorithm," West Publishing Company, 1985, pp. 215-223.

USPTO Non-Final Office Action issued in U.S. Appl. No. 11/618,069, mailed Jan. 5, 2010, 18 pages.

U.S. Appl. No. 10/273,889, Sep. 10, 2003, Office Action.
U.S. Appl. No. 10/273,889, Apr. 16, 2004, Office Action.
U.S. Appl. No. 10/273,889, Jan. 24, 2005, Office Action.
U.S. Appl. No. 10/273,889, Aug. 10, 2005, Notice of Allowance.
U.S. Appl. No. 11/328,455, Dec. 19, 2006, Office Action.
U.S. Appl. No. 11/328,455, Jun. 26, 2007, Office Action.
U.S. Appl. No. 12/791,165, Feb. 22, 2013, Office Action.
U.S. Appl. No. 12/791,165, Jun. 3, 2013, Office Action.
U.S. Appl. No. 12/791,165, Oct. 24, 2013, Office Action.
U.S. Appl. No. 13/296,130, Sep. 25, 2012, Notice of Allowance.
U.S. Appl. No. 13/620,513, Apr. 10, 2013, Office Action.
U.S. Appl. No. 13/620,513, Jul. 25, 2013, Office Action.
U.S. Appl. No. 13/620,513, Nov. 29, 2013, Office Action.
U.S. Appl. No. 13/620,516, Apr. 10, 2013, Office Action.
U.S. Appl. No. 13/620,520, Jan. 28, 2013, Office Action.
U.S. Appl. No. 13/620,520, Jun. 24, 2013, Notice of Allowance.
U.S. Appl. No. 13/620,520, Jul. 19, 2013, Notice of Allowance.
U.S. Appl. No. 13/620,523, Jan. 29, 2013, Office Action.
U.S. Appl. No. 13/620,523, Jun. 20, 2013, Notice of Allowance.
U.S. Appl. No. 13/620,525, Jan. 29, 2013, Office Action.
U.S. Appl. No. 13/620,525, Jun. 24, 2013, Notice of Allowance.
U.S. Appl. No. 13/620,525, Jul. 22, 2013, Notice of Allowance.
U.S. Appl. No. 13/620,529, Jan. 29, 2013, Office Action.
U.S. Appl. No. 13/620,529, May 24, 2013, Notice of Allowance.
U.S. Appl. No. 13/620,529, Jun. 14, 2013, Notice of Allowance.
U.S. Appl. No. 13/620,533, Dec. 20, 2012, Office Action.
U.S. Appl. No. 13/620,536, Dec. 20, 2012, Office Action.
U.S. Appl. No. 13/620,536, Aug. 23, 2013, Office Action.
U.S. Appl. No. 13/296,130, filed Nov. 14, 2011, Coughlin et al.
U.S. Appl. No. 13/620,529, filed Sep. 14, 2012, Coughlin et al.
U.S. Appl. No. 13/620,525, filed Sep. 14, 2012, Coughlin et al.
U.S. Appl. No. 13/620,523, filed Sep. 14, 2012, Coughlin et al.
U.S. Appl. No. 13/520,520, filed Sep. 14, 2012, Coughlin et al.
U.S. Appl. No. 13/620,513, filed Sep. 14, 2012, Meisels et al.
U.S. Appl. No. 13/620,516, filed Sep. 14, 2012, Meisels et al.
U.S. Appl. No. 13/620,536, filed Sep. 14, 2012, Meisels et al.

(56) References Cited

OTHER PUBLICATIONS

U.S. Appl. No. 13/620,533, filed Sep. 14, 2012, Meisels et al.
Sherman, C., "Google Launches Local for Mobile," SearchEngineWatch, reprinted from http://searchenginewatch.com/showPage.html?page=3561956 on Aug. 23, 2012, 4 pages.
International Search Report with Written Opinion for International Application No. PCT/US07/89039, dated Apr. 23, 2008, 16 pages.
International Search Report and Written Opinion for International Application No. PCT/US07/65714, mailed Jun. 20, 2008.
U.S. Appl. No. 11/618,069, Jul. 22, 2009, Office Action.
U.S. Appl. No. 11/618,069, Jul. 9, 2010, Office Action.
U.S. Appl. No. 11/618,069, Jan. 5, 2011, Notice of Allowance.
U.S. Appl. No. 11/966,562, Apr. 9, 2010, Office Action.
U.S. Appl. No. 11/966,562, Sep. 7, 2010, Notice of Allowance.
U.S. Appl. No. 12/962,357, Jan. 25, 2011, Office Action.
U.S. Appl. No. 12/962,357, Jul. 26, 2011, Notice of Allowance.
U.S. Appl. No. 12/296,130, Feb. 6, 2012, Office Action.
U.S. Appl. No. 12/296,130, May 24, 2012, Notice of Allowance.
U.S. Appl. No. 11/618,348, Jun. 3, 2008, Office Action.
U.S. Appl. No. 11/618,348, Nov. 13, 2008, Office Action.
U.S. Appl. No. 11/618,348, Apr. 14, 2009, Office Action.
U.S. Appl. No. 11/618,348, Sep. 23, 2009, Office Action.
U.S. Appl. No. 11/618,348, Feb. 8, 2010, Notice of Allowance.
U.S. Appl. No. 11/618,069, Dec. 31, 2008, Office Action.
U.S. Appl. No. 12/791,165, Aug. 31, 2011, Office Action.
U.S. Appl. No. 12/791,165, Feb. 2, 2012, Office Action.
U.S. Appl. No. 12/791,165, Jun. 18, 2012, Office Action.

\* cited by examiner

100A

| MONDAY, APRIL 23, 2002 | ☐ IDENTIFY A TRAVEL ROUTE AND RESERVE TIME BLOCK ON THE CALENDAR TO ACCOUNT FOR TRAVEL TIME BETWEEN APPOINTMENTS |
|---|---|
| 8:00 AM | |
| 9:00 | |
| 10:00 | MEET WITH PATENT ATTORNEY KARL RENNER AT 1425 K STREET, NW, WASHINGTON, DC 20005 |
| 11:00 | |
| 12:00 PM | |
| 1:00 | PERSONAL INTERVIEW WITH PATENT EXAMINER JOE SMITH AT U.S. PATENT AND TRADEMARK OFFICE 600 DULANY ST., ALEXANDRIA, VA 20854 |
| 2:00 | |
| 3:00 | |
| 4:00 | |
| 5:00 | |
| | |
| | |

| MONDAY, APRIL 23, 2002 | |
|---|---|
| 8:00 AM | |
| 9:00 | |
| 10:00 | APPOINTMENT WITH PATENT ATTORNEY KARL RENNER AT 1425 K STREET, NW, WASHINGTON, DC 20005 |
| 11:00 | |
| 12:00 PM | THIS TIME IS RESERVED FOR TRAVEL TIME FROM 1425 K STREET, NW, WASHINGTON, DC 2005 TO U.S. PATENT AND TRADEMARK OFFICE |
| 1:00 | PERSONAL INTERVIEW WITH PATENT EXAMINER JOE SMITH AT U.S. PATENT AND TRADEMARK OFFICE |
| 2:00 | |
| 3:00 | |
| 4:00 | |
| 5:00 | |
| 6:00 | |
| 7:00 | |
| 8:00 | |
| 9:00 | |

Your first appointment is with Patent Attorney Karl Renner at 10:00 am.

Your second appointment is with Patent Examiner Joe Smith at United Stated Patent and Trademark office. However, we do not have an address for the USPTO. Please specify the (address).

325 — ☐ Directions/Mapping

ALERT DISPLAY

EVEN AFTER TAKING INTO ACCOUNT THE TRAVEL TIME FROM THE FIRST APPOINTMENT TO THE SECOND APPOINTMENT, THERE REMAINS AN UNSCHEDULED TIME PERIOD IN YOUR CALENDAR BETWEEN THE FIRST AND SECOND APPOINTMENTS. WHAT WOULD YOU LIKE TO DO DURING THIS TIME?

☐ SPEND MORE TIME AT THE FIRST APPOINTMENT LOCATION

☐ STOP AT A GAS STATION

☐ START TRAVELING TOWARD THE SECOND APPOINTMENT LOCATION

☐ LOCATE (A POINT OF INTEREST) NEAR (DESTINATION)

---
REMINDER

┌─ 610
☐ Remind me at a (specified time) in advance of the allocated travel time block to leave a first location to arrive on time at the appointment location.
  ☐ Remind me via telephone
  ☐ Remind me via email
  ☐ Remind me via IM
---

---
ALERT

┌─ 710
☐ Alert me if the current road conditions (e.g., traffic congestion) changes.
  ☐ Provide me with suggestions
☐ Alert me at about conflicting appointments.
  ☐ Provide me with suggestions
☐ Alert me if there is a time period that is unscheduled between the appointments.
  ☐ Provide me with suggestions
☐ Alert me if I deviate from the previously calculated route.
  ☐ Provide me with new directions based on present location
---

Alert Display
It is currently 11:00 am, and you are at the first appointment location.

Your second appointment is at 1:00 pm, and the second appointment location appears to be at U.S. Patent and Trademark Office.

Under (normal) conditions, it would take you 60 minutes to arrive at the second appointment location.

However, it appears following conditions have been detected:
    There is a heavy traffic due to an accident on the I-60.

Now, it will take you 3 hours to arrive at the second appointment location.

We suggest you leave now in order to arrive on time at the second appointment location, and you should take a different route, with a travel time of 2 hours, than the previously calculated route to arrive at the second appointment location.

Please (view) the updated route.

ALERT DISPLAY

WE NOTICE YOUR FIRST APPOINTMENT AT 10:00 AM IS SUPPOSED TO LAST FOR AT LEAST 60 MINUTES AND YOUR SECOND APPOINTMENT IS AT 12:00 PM. WE ALSO NOTICE THAT IT TAKES 120 MINUTES TO ARRIVE AT THE SECOND APPOINTMENT LOCATION FROM THE FIRST APPOINTMENT LOCATION PLUS AN APPROXIMATE 10 MINUTES TO GET FROM THE CAR TO THE MEETING. WHAT WOULD YOU LIKE TO DO?

☐ SPEND LESS TIME AT THE FIRST APPOINTMENT

☐ CANCEL OR RESCHEDULE THE SECOND APPOINTMENT

☐ ARRIVE LATE AT THE SECOND APPOINTMENT LOCATION

ALERT DISPLAY

IT IS CURRENTLY 11:00 AM AND IT SEEMS THAT YOU HAVE DEVIATED FROM THE ORIGINAL ROUTE. YOU ARE PRESENT AT 1100 F STREET, NW, WASHINGTON, DC 20005.

YOUR SECOND APPOINTMENT IS AT 1:00 PM.

FROM YOUR NEW LOCATION, IT TAKES 30 MINUTES TO ARRIVE AT YOUR SECOND APPOINTMENT LOCATION.

CLICK HERE FOR DIRECTIONS TO THE SECOND APPOINTMENT LOCATION FROM THE PRESENT LOCATION

ALERT DISPLAY

IT IS CURRENTLY 11:00 AM AND IT SEEMS THAT YOU HAVE DEVIATED FROM THE ORIGINALLY-CALCULATED ROUTE BY LESS THAN A THRESHOLD AMOUNT

YOUR SECOND APPOINTMENT IS AT 1:00 PM.

CLICK HERE FOR DIRECTIONS TO GET BACK ON THE ORIGINALLY-CALCULATED ROUTE

| MONDAY, APRIL 23, 2002 | |
|---|---|
| 8:00 AM | |
| 9:00 | |
| 10:00 | APPOINTMENT WITH PATENT ATTORNEY KARL RENNER AT 1425 K STREET, NW, WASHINGTON, DC 20005 |
| 11:00 | |
| 12:00 PM | THIS TIME IS RESERVED FOR TRAVEL TIME FROM 1425 K STREET, NW, WASHINGTON, DC 2005 TO U.S. PATENT AND TRADEMARK OFFICE |
| 1:00 | PERSONAL INTERVIEW WITH PATENT EXAMINER JOE SMITH AT U.S. PATENT AND TRADEMARK OFFICE |
| 2:00 | |
| 3:00 | |
| 4:00 | |
| 5:00 | |
| 6:00 | |
| 7:00 | |
| 8:00 | |
| 9:00 | |

MONDAY, APRIL 23, 2002 — 1210

| Time | |
|---|---|
| 8:00 AM | |
| 9:00 | |
| 10:00 | APPOINTMENT WITH PATENT ATTORNEY KARL RENNER AT 1425 K STREET, NW, WASHINGTON, DC 20005 — 1215 |
| 11:00 | APPOINTMENT WITH DR. JONES AT 11208 CAMP RD. BETHESDA, MARYLAND — 1265 |
| 12:00 PM | THIS TIME IS RESERVED FOR TRAVEL TIME FROM 1425 K STREET, NW, WASHINGTON, DC 20005 TO U.S. PATENT AND TRADEMARK OFFICE — 1230 |
| 1:00 | PERSONAL INTERVIEW WITH PATENT EXAMINER JOE SMITH AT U.S. PATENT AND TRADEMARK OFFICE — 1220 |
| 2:00 | |
| 3:00 | |
| 4:00 | |
| 5:00 | |
| 6:00 | |
| 7:00 | |
| 8:00 | |
| 9:00 | |

1270 — THIS APPOINTMENT PRESENTS CONFLICT WITH BOTH THE FIRST AND SECOND APPOINTMENT

RESERVING A TIME BLOCK IN A CALENDAR APPLICATION TO ACCOUNT FOR A TRAVEL TIME BETWEEN GEOGRAPHIC LOCATIONS OF APPOINTMENTS

CROSS REFERENCE TO RELATED APPLICATIONS

This application is a continuation-in-part of U.S. patent application Ser. No. 11/618,069, filed Dec. 29, 2006 and entitled "Communicating Appointment And/Or Mapping Information Among a Calendar Application And a Navigation Application." The present application also claims priority from U.S. Provisional Application No. 60/888,850, filed Feb. 8, 2007 and entitled "INTELLIGENT CALENDARING APPLICATION" and from U.S. Provisional Application No. 60/945,805, filed Jun. 22, 2007 and entitled "RESERVING A TIME BLOCK IN A CALENDAR APPLICATION TO ACCOUNT FOR A TRAVEL TIME BETWEEN GEOGRAPHIC LOCATIONS OF APPOINTMENTS." The entire content of the prior applications is incorporated herein by reference.

TECHNICAL FIELD

This disclosure relates to reserving a time block in a calendar application to account for a travel time between geographic locations of appointments.

BACKGROUND

A user may populate an electronic calendar with appointments that take place at different locations. The electronic calendar may be, for example, a Microsoft Outlook calendar, and may be manually programmed to include a date and time of appointments and locations associated with the appointments.

SUMMARY

In one aspect, travel time between appointments is identified and a time block on a calendar application is reserved to account for such travel time. A first appointment in a calendar application is identified, and a geographic location of the first appointment is identified. A second appointment that occurs later in time than the first appointment in the calendar application is identified, and a geographic location of the second appointment is identified. A route extending from the geographic location of the first appointment to the geographic location of the second appointment is identified, and a travel time associated with the route is identified. An amount of unscheduled time between the first appointment and the second appointment is determined, and it is determined whether the amount of unscheduled time exceeds the travel time. If it is determined that the amount of unscheduled time exceeds the travel time, a time block is reserved on the calendar application to account for the travel time.

Implementations may include one or more of the following features. For example, an ending time of the first appointment may be identified, a starting time of the second appointment may be identified, and the ending time of the first appointment may be subtracted from the starting time of the second appointment. In some implementations, it may be determined whether the amount of unscheduled time exceeds the travel time by more than a threshold amount. If it is determined that unscheduled time exceeds the travel time by more than the threshold amount, a message may be provided that informs a user of the unscheduled time.

A reminder for the second appointment may be automatically set without user input. The reminder may be set for a specified time that precedes the starting time of the second appointment time by at least the travel time to the second appointment. A notification window may be displayed at the specified time that precedes the starting time of the second appointment time by at least the travel time to the second appointment. The notification window may be structured and arranged to remind the user about the second appointment.

In some examples, it may be determined whether the travel time exceeds the amount of unscheduled time, and, if it is determined that travel time exceeds the amount of unscheduled time, an alert message may be provided to inform the user that, based on the current scheduling of the first and second appointments, the user would not have enough time to arrive at the second appointment location. In these examples, one or more suggestions may be provided to enable the user to respond to the alert message. The one or more suggestions may include a suggestion for at least one of: (1) leave the first appointment sooner than the scheduled ending time of the first appointment, (2) cancel, one or both of the first or second appointments, (3) reschedule the first or second appointment, and (4) notify the other attendees of the second appointment, or another designee, that the user will arrive late. Further, in these examples, people attending the second appointment may be identified, and time availability of the people attending the second appointment may be identified. Based on the time availability of the people attending the second appointment, steps may be taken to reschedule the second appointment at a mutually convenient time for people attending the second appointment.

In some implementations, the calendar application may be accessed via a navigation application in response to activation of a transferring control tool that appears within an interface of the navigation application, and the first appointment and the second appointment may be identified in the calendar application. In these implementations, the transferring control tool may be configured to import time and geographic information of the first and second appointments to the navigation application. The transferring control may be further configured to cause the navigation application to identify the route and the travel time associated with the route, calculate the remaining time between the ending time of the first appointment and the starting time of the second appointment, determine whether the remaining time exceeds the travel time, and instruct the calendar application to place the hold between the first appointment and the second appointment to account for the travel time if it is determined the remaining time exceeds the travel time.

In some examples, the calendar application may be accessed via a client device, and the first appointment and the second appointment may be identified in the calendar application. In these examples, the client device may interface between the calendar application and a navigation application. The calendar application may be accessed in response to activation of a transferring control tool within the client device, and the ending time and the geographic location of the first appointment and the starting time and the geographic location of the second appointment may be communicated to the navigation application in response to the activation of the transferring control.

The current location of a user may be monitored, and a change in the current location of the user may be identified. The route extending from the geographic location of the first appointment to the geographic location of the second appointment may be referenced and it may be determined whether the current location of the user exceeds a threshold amount from the route. If it is determined that the current location of the user exceeds the threshold amount from the route, the user may be provided with direction to the second appointment from the current location of the user.

In another aspect, a first appointment in a calendar application is identified, a geographic location of the first appointment is identified, and a time of the first appointment is identified. A request to schedule a second appointment at a requested time is received from a user, and a geographic location of the second appointment is identified. A route extending between the geographic location of the first appointment and the geographic location of the second appointment is identified, and a travel time associated with the route is identified. An amount of unscheduled time between the first appointment and the second appointment is determined, and it is determined whether the amount of unscheduled time exceeds the travel time. If it is determined that the amount of unscheduled time exceeds the travel time, the second appointment is scheduled at the requested time, and a time block is reserved on the calendar application to account for the travel time.

Implementations may include one or more of the following features. For example, before scheduling the second appointment at the first particular time, the user may be alerted about a possible conflict if it is determined that the travel time exceeds the amount of unscheduled time. In response to alerting the user, a second request to schedule the second appointment at an updated requested time may be received from the user, and an amount of unscheduled time between the first appointment and the second appointment may be determined based on the updated requested time for the second appointment. If it is determined that the amount of unscheduled time exceeds the travel time, the second appointment may be scheduled at the updated requested time, and a time block may be reserved on the calendar application to account for the travel time.

In yet another aspect, travel conditions are monitored and a user is alerted when changes to travel conditions impact a travel time entry scheduled in a calendar application associated with the user. Travel conditions are monitored for a route of travel associated with a travel time entry scheduled in a calendar application associated with a user. The travel time entry corresponds to an estimated travel time needed for the user to, using the route of travel, arrive at a geographic location of an appointment scheduled in the calendar application associated with the user. A change in travel conditions is detected for the route of travel associated with the travel time block, and, in response to detecting the change in travel conditions, an updated travel time needed for the user to, using the route of travel, arrive at the geographic location of the appointment scheduled in the calendar application associated with the user is determined. The updated travel time is compared with time required by the travel time entry, and, based on comparison results, it is determined whether the updated travel time is greater than the time required by the travel time entry by more than a threshold. Conditioned on determining that the updated travel time is more than the threshold greater than the time required by the travel time entry, the user is alerted about the updated travel time. Conditioned on determining that the updated travel time is not more than the threshold greater than the time required by the travel time entry, the travel time entry is maintained.

Implementations may include one or more of the following features. For example, conditioned on determining that the updated travel time is more than the threshold greater than the time required by the travel time entry, one or more alternative routes of travel to the geographic location of the appointment scheduled in the calendar application associated with the user may be identified, and one or more alternative travel times associated with each of the identified one or more alternative routes of travel may be determined. It may be determined whether at least one of the one or more alternative travel times is less than the updated travel time. Conditioned on determining that at least one of the one or more alternative travel times is less than the updated travel time, at least one of the one or more alternative routes of travel for which the one or more alternative travel times is lowest may be selected and the user may be alerted about the selected at least one of the one or more alternative routes of travel. Conditioned on determining that at least one of the one or more alternative travel times is not less than the updated travel time, the user may be alerted about current travel conditions and the user may be informed that the route of travel remains most efficient.

In some implementations, the travel time entry may correspond to an estimated travel time needed for the user to, using the route of travel, travel from a first geographic location of a first appointment to a second geographic location of a second appointment. In these implementations, conditioned on determining that the updated travel time is more than the threshold greater than the time required by the travel time entry, a time between an ending time of the first appointment and a starting time of the second appointment may be determined, and the updated travel time may be compared with the time between the ending time of the first appointment and the starting time of the second appointment. Based on comparison results, it may be determined whether the updated travel time is greater than the time between the ending time of the first appointment and the starting time of the second appointment. Conditioned on determining that the updated travel time is greater than the time between the ending time of the first appointment and the starting time of the second appointment, the user may be alerted that at least one of the first appointment and the second appointment needs to be modified to account for the updated travel time. Conditioned on determining that the updated travel time is not greater than the time between the ending time of the first appointment and the starting time of the second appointment, the travel time entry may be updated to correspond to the updated travel time; and the user may be alerted of the updated travel time entry.

The user may be alerted that the user needs to leave the first geographic location of the first appointment earlier than previously scheduled. Conditioned on determining that the updated travel time is greater than the time between the ending time of the first appointment and the starting time of the second appointment, attendees of the second appointment, or another designee, may be alerted that the user may arrive late to the second appointment.

Conditioned on determining that the updated travel time is more than the threshold greater than the time required by the travel time entry, one or more alternative routes of travel from the first geographic location of the first appointment to the second geographic location of the second appointment may be identified, and one or more alternative travel times associated with each of the identified one or more alternative routes of travel may be determined. It may be determined whether at least one of the one or more alternative travel times is less than the updated travel time. Conditioned on determining that at least one of the one or more alternative travel times is less than the updated travel time, one of the one or more alternative routes of travel for which the one or more alternative travel times is lowest may be selected, and the time between the ending time of the first appointment and the starting time of the second appointment may be compared with the alternative travel time associated with the selected alternative route of travel. Based on comparison results, it may be determined whether the time between the ending time of the first appointment and the starting time of the second appointment is greater than the alternative travel time associated with the selected alternative route of travel. Conditioned on determining that the time between the ending time of the first appointment and the starting time of the second appointment is greater than the alternative travel time associated with the selected alternative route of travel, the travel time entry may be updated to correspond to the alternative travel time associated with the selected alternative route of travel, and alerting the user may be alerted of the updated travel time entry and the selected alternative route of travel.

Alerting the user that at least one of the first appointment and the second appointment needs to be modified to account for the updated travel time also may be conditioned on determining that the time between the ending time of the first appointment and the starting time of the second appointment is not greater than the alternative travel time associated with the selected alternative route of travel, and updating the travel time entry to correspond to the updated travel time and alerting the user of the updated travel time entry also may be conditioned on determining that at least one of the one or more alternative travel times is not less than the updated travel time.

In a further aspect, a travel time entry in a calendar associated with a user is automatically modified in response to cancellation of a corresponding appointment entry in the calendar associated with the user. Cancellation of an appointment entry in a calendar associated with a user is detecting, and, in response to detecting cancellation of the appointment entry in the calendar associated with the user, it is determined whether the appointment entry is related to a travel time entry in the calendar associated with the user. Conditioned on determining that the appointment entry is related to a travel time entry in the calendar associated with the user, the travel time entry related to the appointment entry is identified, and the travel time entry is modified to account for cancellation of the appointment entry.

Implementations may include one or more of the following features. For instance, the user may be informed of the modification of the travel time entry as a consequence of the cancellation of the appointment entry. It may be determined that the travel time entry is near a beginning or an end of a calendar day, and one or more default travel locations corresponding to typical travel by the user at the beginning or the end of the calendar day may be identified. The travel time entry and the identified one or more default travel locations may be identified, and the travel time entry may be modified to account for cancellation of the appointment entry based on the analysis.

In some implementations, one or more calendar entries scheduled prior or subsequent to the travel time entry may be identified, and the travel time entry and the identified one or more calendar entries scheduled prior or subsequent to the travel time entry may be analyzed. The travel time entry may be modified to account for cancellation of the appointment entry based on the analysis. In these implementations, the appointment entry may be a first appointment entry, and a second appointment entry scheduled immediately prior to the travel time entry may be identified. It may be determined that, after cancellation of the first appointment entry, no calendar entries are scheduled more than a threshold amount of time subsequent to the travel time entry. The travel time entry may be cancelled, and the user may be informed of the cancellation of the travel time entry.

In some examples, the appointment entry may be a first appointment entry, and a second appointment entry scheduled immediately subsequent to the travel time entry may be identified. In these example, it may be determined that, after cancellation of the first appointment entry, no calendar entries are scheduled more than a threshold amount of time prior to the travel time entry. The travel time entry may be canceled, and the user may be informed of the cancellation of the travel time entry.

In some implementations, the appointment entry may be a first appointment entry, a second appointment entry scheduled prior to the travel time entry may be identified, and a third appointment entry scheduled subsequent to the travel time entry may be identified. In these implementations, it may be determined whether travel time is needed between the second appointment entry and the third appointment entry. Conditioned on determining that travel time is not needed between the second appointment entry and the third appointment entry, the travel time entry may be canceled. Conditioned on determining that travel time is needed between the second appointment entry and the third appointment entry, the travel time needed between the second appointment entry and the third appointment entry may be determined, and the travel time entry may be modified to correspond to the travel time needed between the second appointment entry and the third appointment entry.

The travel time entry may be lengthened or shortened. A start time and/or an end time of the travel time entry may be adjusted.

The appointment entry may be a first appointment entry and the travel time entry may be a first travel time entry. A second appointment entry scheduled immediately prior to the first travel time entry may be identified, a second travel time entry scheduled immediately subsequent to the first appointment entry may be identified, and a third appointment entry scheduled immediately subsequent to the second travel time entry may be identified. The first travel time entry, the second appointment entry, the second travel time entry, and the third appointment entry may be analyzed, a travel time needed to travel between the second appointment and the third appointment may be determined, and the first travel time entry and the second travel time entry may be modified to produce a single travel time entry that corresponds to the travel time needed to travel between the second appointment and the third appointment.

In another aspect, telephone or video conference calls are accounted for in scheduling travel time corresponding to appointments in a calendar associated with a user. A request is received to schedule, in a calendar associated with a user, a first appointment at a first time. The first appointment corresponds to a first geographic location. A second appointment that follows the first appointment is identified in the calendar associated with the user, and it is determined whether the second appointment is an appointment for a telephone or video conference call.

Conditioned on determining that the second appointment is an appointment for a telephone or video conference call, travel time associated with the first appointment is accounted for without regard for the second appointment by identifying, in the calendar associated with the user, a third appointment that follows the second appointment, and determining that the third appointment corresponds to a third geographic location. In response to determining that the third appointment corresponds to the third geographic location, the third geographic location corresponding to the third appointment is identified, and a first travel time associated with traveling from the first geographic location to the third geographic location is determined. A time between an ending time of the first appointment and a starting time of the third appointment is determined, and the first travel time is compared with the time between the ending time of the first appointment and the starting time of the third appointment. Based on comparison results, it is determined whether the first travel time is greater than the time between the ending time of the first appointment and the starting time of the third appointment. Conditioned on determining that the first travel time is not greater than the time between the ending time of the first appointment and the starting time of the third appointment, the request to schedule the first appointment is granted, and a travel time entry corresponding to the first travel time associated with traveling from the first geographic location to the third geographic location is added in the calendar associated with the user. Conditioned on determining that the first travel time is greater than the time between the ending time of the first appointment and the starting time of the third appointment, the user is alerted that insufficient travel time exists for scheduling the first appointment at the first time.

Conditioned on determining that the second appointment is not an appointment for a telephone or video conference call, a second geographic location associated with the second appointment is identified, and a second travel time associated with traveling from the first geographic location to the second geographic location is determined. A time between an ending time of the first appointment and a starting time of the second appointment is determined, and the second travel time is compared with the time between the ending time of the first appointment and the starting time of the second appointment. Based on comparison results, it is determined whether the second travel time is greater than the time between the ending time of the first appointment and the starting time of the second appointment. Conditioned on determining that the second travel time is not greater than the time between the ending time of the first appointment and the starting time of the second appointment, the request to schedule the first appointment is granted, and a travel time entry corresponding to the second travel time associated with traveling from the first geographic location to the second geographic location is added in the calendar associated with the user. Conditioned on determining that the second travel time is greater than the time between the ending time of the first appointment and the starting time of the second appointment, the user is alerted that insufficient travel time exists for scheduling the first appointment at the first time.

Implementations may include one or more of the following features. For example, the first appointment may identify the first geographic location corresponding to the first appointment. It may be determined whether the second appointment identifies a geographic location and it may be determined whether the second appointment identifies a telephone or video conference call number. The travel time entry corresponding to the second travel time may be added during the second appointment.

The user may be able to determine whether to add the travel time entry corresponding to the first travel time before the second appointment, after the second appointment, or during the second appointment. Content included in a calendar entry corresponding to the second appointment may be accessed, and the content included in the calendar entry corresponding to the second appointment may be analyzed. Based on the analysis, it may be automatically determined whether the second appointment is an appointment for a telephone or video conference call.

In some implementations, the user may be able to determine whether to allow travel time to be scheduled during the second appointment. Conditioned on the user determining to allow travel time to be scheduled during the second appointment, travel time associated with the first appointment may be accounted for without regard for the second appointment. Conditioned on the user determining not to allow travel time to be scheduled during the second appointment, the third appointment that follows the second appointment may be identified in the calendar associated with the user, and it may be determined that the third appointment is not an appointment for a telephone or video conference call. In response to determining that the third appointment is not an appointment for a telephone or video conference call, the third geographic location associated with the third appointment may be identified, and the first travel time associated with traveling from the first geographic location to the third geographic location may be determined. A time between an ending time of the second appointment and a starting time of the third appointment may be determined, and the first travel time may be compared with the time between the ending time of the second appointment and the starting time of the third appointment. Based on comparison results, it may be determined whether the first travel time is greater than the time between the ending time of the second appointment and the starting time of the third appointment. Conditioned on determining that the first travel time is not greater than the time between the ending time of the second appointment and the starting time of the third appointment, the request to schedule the first appointment may be granted, and a travel time entry corresponding to the first travel time associated with traveling from the first geographic location to the third geographic location may be added in the calendar associated with the user. Conditioned on determining that the first travel time is greater than the time between the ending time of the second appointment and the starting time of the third appointment, the user may be alerted that insufficient travel time exists for scheduling the first appointment at the first time.

In some examples, the user may be able to set a default parameter that indicates whether or not the user wishes to allow travel time to be scheduled during telephone or video conference call appointments. The user may be asked whether the user wishes to allow travel time to be scheduled during the second appointment, and an answer may be received from the user indicating whether the user wishes to allow travel time to be scheduled during the second appointment.

In another aspect, unscheduled time between two appointment entries in a calendar other than travel time is identified and options are presented to a user for using the unscheduled time. At least one of a first appointment entry in a calendar associated with a user and a second appointment entry in the calendar associated with the user is identified. The first appointment entry is associated with a first geographic location, the second appointment entry is associated with a second geographic location that is different than the first geographic location, and a starting time of the second appointment entry is subsequent to an ending time of the first appointment entry. A travel time entry corresponding to a travel time between the first geographic location associated with the first appointment entry and the second geographic location associated with the second appointment entry is identified, and it is determined whether a time between the ending time of the first appointment entry and the starting time of the second appointment entry is more than a threshold greater than time required by the travel time entry. Conditioned on determining that the time between the ending time of the first appointment entry and the starting time of the second appointment entry is more than a threshold greater than the time required by the travel time entry, unscheduled time, other than travel time, between the first appointment entry and the second appointment entry is identified, one or more options for using the identified unscheduled time are identified, and the identified one or more options are presented to the user.

Implementations may include one or more of the following features. For example, the first appointment entry in the calendar associated with the user and the second appointment entry in the calendar associated with the user may be identified. The ending time of the first appointment entry may be determined, the starting time of the second appointment entry may be determined, and the time between the ending time of the first appointment entry and the starting time of the second appointment entry may be computed. The time between the ending time of the first appointment entry and the starting time of the second appointment entry with the time required by the travel time entry may be compared. Based on comparison results, it may be determined whether the time between the ending time of the first appointment entry and the starting time of the second appointment entry is more than the threshold greater than the time required by the travel time entry.

In some examples, information related to one or more options available for using unscheduled time may be accessed, and a time associated with each of the one or more options may be determined based on the accessed information related to the one or more options available for using unscheduled time. The determined time associated with each of the one or more options may be compared with the identified unscheduled time, and, based on comparison results, options for which the determined time is less than or equal to the identified unscheduled time may be identified. In these examples, information related to interests of the user may be accessed and one or more options may be selected from among the identified options for which the determined time is less than or equal to the identified unscheduled time based on the information related to the interests of the user.

Also, an option to spend more time at the first geographic location subsequent to the first appointment may be identified, an option to spend more time at the second geographic location prior to the second appointment may be identified, and/or an option to visit a point of interest located proximate to the first geographic location may be identified. In addition, an option to visit a point of interest located proximate to the second geographic location may be identified, an option to visit a point of interest located along a route between the first geographic location and the second geographic location may be identified, and an option to reschedule at least one of the first and second appointments to minimize the identified unscheduled time may be identified.

In a further aspect, time associated with modality-specific incidentals to travel is included in determining a travel time for scheduling calendar appointments. A first appointment associated with a calendar of a user is identified, and a second appointment associated with the calendar of the user is identified. The first appointment corresponds to a first geographic location, and the second appointment corresponds to a second geographic location that is different than the first geographic location. A route between the first geographic location and the second geographic location is identified, and a modality of travel for traveling the route between the first geographic location and the second geographic location is determined. A modality-based travel time associated with traveling the route between the first geographic location and the second geographic location using the determined modality of travel is determined, and at least one incidental travel time associated with traveling the route between the first geographic location and the second geographic location using the determined modality of travel is determined. A total travel time for traveling the route between the first geographic location and the second geographic location is determined based on the determined modality-based travel time and the determined at least one incidental travel time, and scheduling of the first appointment and the second appointment is handled based on the determined total travel time.

Implementations may include one or more of the following features. An automobile may be determined as the modality of travel for traveling the route between the first geographic location and the second geographic location, and a mapping device may be used to determine an automobile travel time associated with traveling the route between the first geographic location and the second geographic location using the automobile. A walking travel time associated with walking from a building to the automobile prior or subsequent to traveling the route between the first geographic location and the second geographic location using the automobile may be determined, and the walking travel time may be added to the automobile travel time.

In some implementations, an airplane may be determined as the modality of travel for traveling the route between the first geographic location and the second geographic location, and an air travel time associated with traveling the route between the first geographic location and the second geographic location using the airplane may be determined. A security travel time associated with going through security prior to boarding the airplane may be determined, and the security travel time may be added to the air travel time.

In some examples, electronic data associated with the first appointment may be accessed, electronic data associated with the second appointment may be accessed, and information associated with a distance between the first Geographic location and the second geographic location may be accessed. The electronic data associated with the first appointment, the electronic data associated with the second appointment, and the information associated with the distance between the first geographic location and the second geographic location may be analyzed. Based on the analysis, the modality of travel that provides the shortest travel time for traveling the route between the first geographic location and the second geographic location may be automatically determined.

Furthers at least one of content associated with the first appointment and a geographic location field associated with the first appointment may be accessed, and a driving map associated with traveling between the first geographic location and the second geographic location may be accessed. The driving map may account for potential driving routes between the first geographic location and the second geographic location. A walking map associated with traveling between the first geographic location and the second geographic location may be accessed. The walking map may account for potential walking routes between the first geographic location and the second geographic location.

The user may be able to select the modality of travel for traveling the route between the first geographic location and the second geographic location. In addition, multiple, different modalities of travel for traveling the route between the first geographic location and the second geographic location may be determined, and a modality-based travel time associated with traveling the route between the first geographic location and the second geographic location using the determined multiple, different modalities of travel may be determined. At least one incidental travel time associated with transitioning from a first modality of travel to a second modality of travel may be determined.

The details of one or more implementations are set forth in the accompanying drawings and the description below. Other features will be apparent from the description and drawings, and from the claims.

DESCRIPTION OF DRAWINGS

FIGS. 1A and 1B illustrate exemplary calendar application interfaces, configured to make a user of the calendar application able to identify a travel route extending from a geographic location of a first appointment to a geographic location of a second appointment and to reserve, within the calendar application, a time block for a travel time associated with the travel route.

FIGS. 3A and 3B illustrate an exemplary process and an exemplary user interface for soliciting and receiving, from the user, an address associated with an appointment.

FIG. 5 illustrates an exemplary UI used to inform a user of an unscheduled time in the user's calendar.

FIG. 6 illustrates an exemplary UI that makes the user able to set a reminder in calendar application.

FIG. 7 illustrates an exemplary UI used to allow a user to set an alert message, alerting the user of certain pre-defined conditions/events.

FIG. 8B illustrates an exemplary UI that may be generated as a result of the process illustrated in FIG. 8A and presented to the user to alert a user about a change in current road conditions.

FIG. 9B illustrates an exemplary user interface that may be generated as a result of the process illustrated in FIG. 9A to alert a user about conflicting appointments.

FIG. 10B illustrates an exemplary user interface that may be generated as a result of the processes illustrated in FIG. 10A to alert a user that the user has deviated from an original route.

FIG. 10C illustrates an exemplary user interface used to alert a user that the user has deviated from an originally-calculated route by less than a threshold amount and to help the user to get back on the originally-calculated route.

FIGS. 12A-12D illustrate, within UIs 1200A-1200D, an exemplary sequence of interactions between a calendar application and a user wishing to schedule one or more appointments using the process 1100 described with respect to FIG. 11.

DETAILED DESCRIPTION

Figure 2:
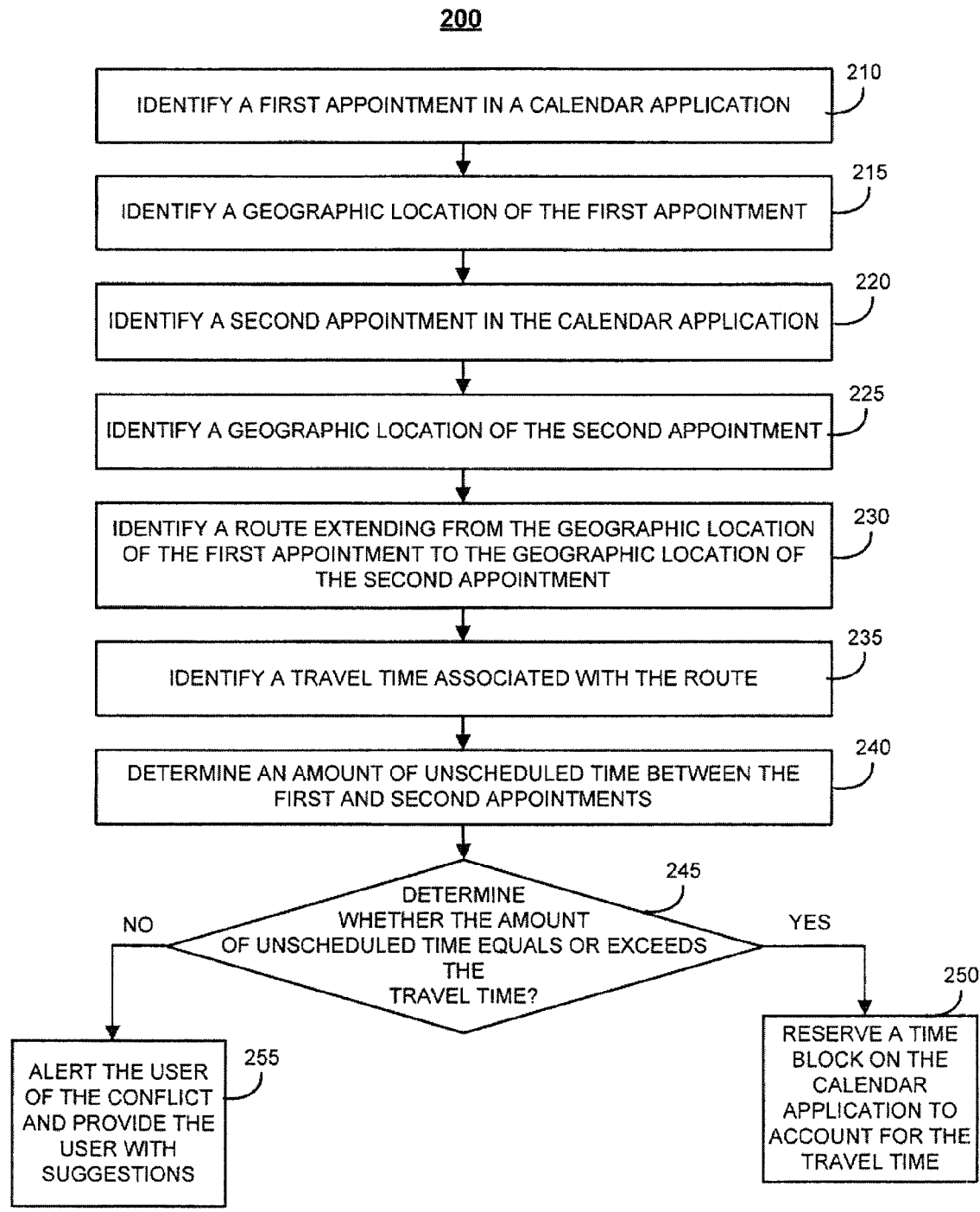
FIG. 2 illustrates an exemplary process used to identify a travel route between already scheduled first and second appointments and to reserve, within a calendar application, a time block to account for a travel time associated with the travel route.
Figure 3A:
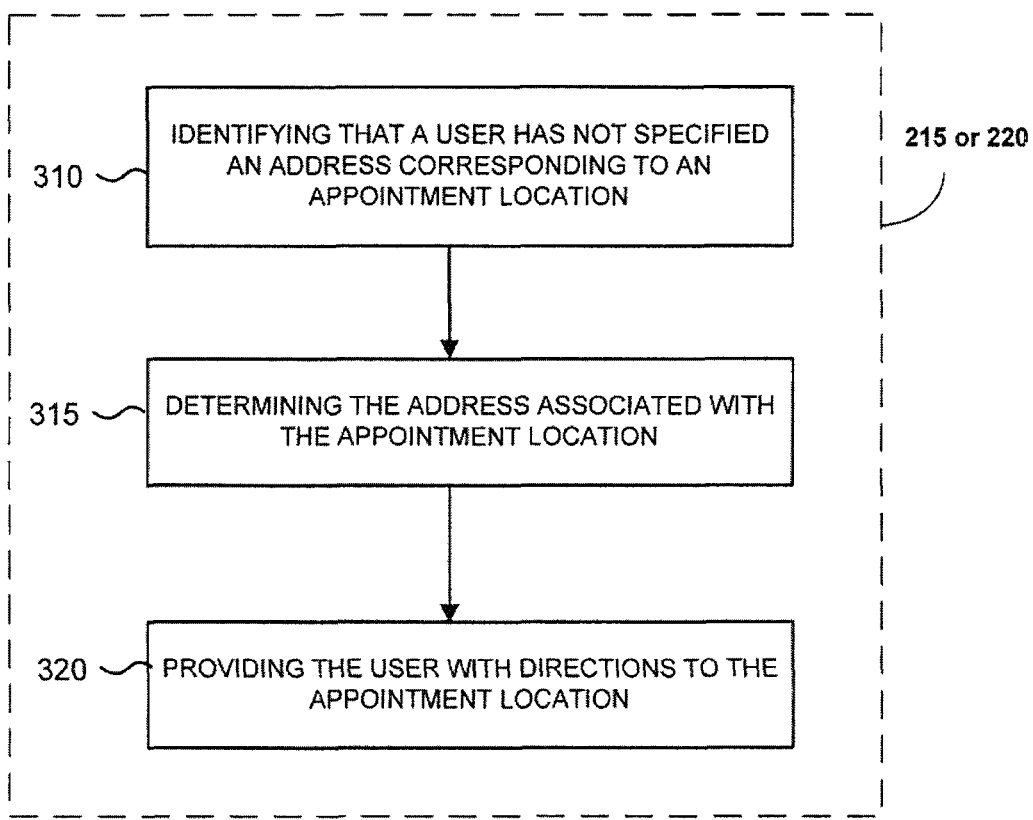

It is contemplated that an electronic calendar may be configured to provide appointment-to-appointment directions (e.g., directions from a first appointment to a second appointment and from the second appointment to a third appointment), and/or to account for the travel time between appointments. As such, the user may be alerted when the timing of an appointment presents a potential conflict with another appointment due to the travel time between the two appointments.

Along these lines, a user who maintains a calendar with appointments that take place at various locations may find it difficult or cumbersome to identify a travel route through the locations of the user's appointments. Particularly, the user may find it time-consuming to manually look-up and print out directions for segments of a travel route before leaving, for example, the user's home or work place.

To reduce the user's burden in identifying a travel route through the geographic locations of the user's appointments, in one implementation described generally with respect to FIGS. 1A-1B and 2-4, a calendar application is configured to allow the user to automatically generate appointment-to-appointment directions and to reserve a time block between user's appointments to account for the travel time associated with a route extending from one appointment to the next. To this end, the calendar application includes a navigation component and further includes a control option, manifested by an icon or a "setting," selection of which results in generation of a travel route between multiple appointments and further results in reservation of a time block within the user's calendar to account for the travel time associated with the travel route. In some implementations, a navigation application includes a calendar component and the navigation application including the calendar component performs operations described throughout the disclosure. In further implementations, a separate calendar application and a separate navigation application exchange electronic communications to perform operations described throughout the disclosure.

To illustrate, assume that a user has two appointments within a calendar application (e.g., a first appointment and a second appointment) and that the user selects, from within the calendar application, the control icon. In response, the calendar application automatically (1) identifies a travel route extending from a geographic location of the first appointment to a geographic location of the second appointment, (2) identifies a travel time associated with the travel route, and (3) places a hold or blocks a period of time on the user's calendar to account for such travel time. Additionally, the calendar application may provide the user with a reminder about the user's second appointment, taking into account the travel time associated with the calculated route extending from the geographic location of the first appointment to the geographic location of the second appointment.

As such, depending on the required travel time, the user may be presented with an option of selecting to travel immediately following the first appointment or just prior to the second appointment. In the absence of sufficient time between the first and second appointments, the user is provided with an alert message at the time of scheduling the first and/or the second appointment, informing the user of the same, as more fully described below with respect to FIGS. 9A-9C. The alert message may be in several forms. In one example, the alert message is in the form of automatic e-mail to the user (or a person to whom the user delegates the task of keeping the user's calendar), informing the user of the conflict. In another example, the alert message is provided as a user interface ("UI") within the calendar application. In either case, the alert message provides the user with several options to allow the user (or a person to whom the user delegates the task of keeping the user's calendar) to account for such a conflict.

For instance, the alert message indicates to the user the anticipated need to leave the first appointment earlier than its scheduled ending time or arriving at the second appointment later than its scheduled starting time. Alternatively, the alert message may provide the user with an option to reschedule the first and/or the second appointment. To this end and as described with respect to FIG. 9C, the calendar application may attempt to identify the availability of the participants of the first appointment and/or the second appointment for rescheduling or notification of late arrival either of the first and/or second appointments. In this manner, the user is presented with several options to resolve the conflict (e.g., absence of sufficient travel time) between the first and second appointments.

In another implementation described generally with respect to FIG. 5, after taking into the account the travel time associated with the travel route between the first and second appointments, the calendar application identifies that there is an unscheduled time period in the user's calendar, and the calendar application informs the user of the same. Along these lines, the calendar application may provide the user with suggestions as to how the user should fill in the identified time gap between the user's first and second appointments. This may help the user to more efficiently manage the unscheduled times within the user's daily calendar.

In one example, the calendar application presents to the user a UI, allowing the user to identify a point of interest at which the user is interested in spending the unscheduled time. In response, the user identifies a point of interest (e.g., a coffee shop or a book store) and a geographic location associated therewith. The geographic location may include a specific address associated with the point of interest. Alternatively, the geographic location may include a geographic area/proximity within which the point of interest should be located. In either case, this implementation allows the user to perform a geographically limited search for a particular point of interest to fill in the identified gap between the user's appointments.

In another implementation described generally with respect to FIGS. 11 and 12A-12D, instead of generating appointment-to-appointment directions and reserving a time block to account for the travel time between appointments after the appointments are scheduled, the calendar application generates appointment-to-appointment directions and reserves a time block to account for the travel time between the appointments at the time of scheduling an appointment. To illustrate, assume that the user has scheduled a first appointment within the user's calendar and the user wishes to schedule a second appointment within the user's calendar. Upon indicating a desire to schedule the second appointment, the calendar notes the proposed time and location of the second appointment.

Thereafter, the calendar application automatically identifies a route extending between the first appointment and the second appointment and identifies the travel time associated with the route. If the travel time exceeds the time gap between the first and second appointments, the calendar application alerts the user of the same before accepting the second appointment at the requested time. As such, the user immediately realizes the conflict (e.g., absence of sufficient travel time between the first and second appointments) and is allowed to schedule the second appointment at another time to avoid such conflict. This minimizes the hassle of later recognizing such conflict and having to reschedule the appointment at that time.

However, if the travel time associated with the route does not exceed the time gap between the two appointments, the calendar application schedules the second appointment at the requested time. Along these lines, if the user now wishes to schedule a third appointment between the first and second appointments, the calendar application first ensures that the proposed timing of the third appointment does not present a conflict (e.g., absence of sufficient travel time between the first and third appointments or between the third and second appointments) before accepting the third appointment.

In particular, the calendar application automatically identifies a first route extending from the geographic location of the first appointment to the geographic location of the third appointment and identifies a first travel time associated with the first route. Similarly, the calendar application automatically identifies a second route extending from the geographic location of the third appointment to the geographic location of the second appointment and identifies a second travel time associated with the second route. The calendar application then compares the first travel time with the time gap between the first and third appointments and similarly compares the second travel time with the time gap between the third and second appointments.

If the first travel time exceeds the time gap between the first and third appointments or the second travel time exceeds the time gap between the third and the second appointments, the calendar application alerts the user before accepting the third appointment at the requested time. As such, the user immediately realizes the conflict and is made able to schedule the third appointment at another time to avoid such conflict.

Alternatively, if the first travel time does not exceed the time gap between the first and third appointments and the second travel time also does not exceed the time gap between the third and second appointments, the calendar application schedules the third appointment at the requested time.

FIGS. 1A and 1B illustrate exemplary calendar application interfaces, allowing a user of the calendar application to identify a travel route extending from a geographic location of a first appointment to a geographic location of a second appointment and to reserve, within the calendar application, a time block for a travel time associated with the travel route. The user interfaces ("UIs") of FIGS. 1A and 1B are generally similar. For ease of description, the implementation of FIG. 1A is discussed in detail, and a description of redundant aspects of the implementation of FIG. 1B is omitted for brevity.

FIG. 1A illustrates an exemplary UI 100A used for identifying a travel route between multiple appointments and reserving, within a calendar application, a time block for a travel time associated with the travel route. In particular, the UI 100A includes a calendar application interface 110. The calendar application interface 110 identifies, within a particular day (e.g., Monday, Apr. 23, 2002), a first appointment 115, a second appointment 120, and a control icon 125. As shown, the first appointment 115 is with "patent attorney Karl Renner at 1425 K Street, NW, Washington D.C. 20005." And, the first appointment 115 is from 10:00 am to 11:00 am. The second appointment 120 is with "patent examiner Joe Smith at the U.S. Patent and Trademark Office." And, the second appointment 120 is from 1:00 pm to 2:00 pm.

The calendar application interface 110 also includes the control icon 125. The control icon 125 is structured and arranged for identifying a travel route extending from a geographic location of the first appointment 115 to the geographic location of the second appointment 120 and for reserving a time block, within a calendar application, to account for the travel time associated with the travel route. To this end, the selection of the control icon 116 prompts the calendar application to (1) identify a route extending from the geographic location of the first appointment 115 to the geographic location of the second appointment 120, (2) identify a travel time associated with the route, and (3) reserve a time block within the calendar application to account for the travel time, as more fully described below with respect to FIGS. 1B and 2.

FIG. 1B illustrates the calendar application interface 11 with the control icon 125 being activated. As shown, the selection of the control icon 125 prompts the calendar application to reserve a travel time block 130 between the first appointment 115 and the second appointment 120. In one implementation, the selection of the time block 130 provides the user with directions from the geographic location of the first appointment 115 to the geographic location of the second appointment 120.

FIG. 2 illustrates an exemplary process 200 used to identify a travel route between first and second appointments and to reserve, within a calendar application, a time block to account for a travel time associated with the travel route. In keeping with the previous example and for convenience, the calendar application described with respect to FIGS. 1A and 1B is referenced as performing the process 200. In particular, the process 200 involves the calendar application interface 110, the first appointment 115, the second appointment 120, the control icon 125, and the travel time block 130. Although the process 200 is described below as being performed by the calendar application, it should be understood that it can be performed by a navigation application. Alternatively or additionally, some of the actions within the process 200 may be performed by the calendar application and others may be performed by the navigation application. Alternatively or additionally, the process 200 may be performed by an application that acts as an interface between the navigation and calendar applications.

The process 200 includes the calendar application identifying a first appointment in a calendar application (210) and identifying a geographic location of the first appointment (215). To do so, in one implementation, the calendar application references a location field associated with the first appointment 115 to identify the location associated with the first appointment 115. Alternatively or additionally, the calendar application may reference other fields associated with the first appointment 115 and may search for key words identifying an address. For example, the calendar application may search for a zip code, city, and/or state name to identify an address. In keeping with the previous example described with respect to FIGS. 1A and 1B, the calendar application identifies that the geographic location of the first appointment 115 is at "1425 K Street, NW, Washington D.C. 20005."

Similarly, the process 200 includes the calendar application identifying a second appointment in the calendar application (220) and identifying the geographic location of the second appointment (225). Identifying the second appointment may include identifying an existing appointment already scheduled within a calendar application. Alternatively or additionally, identifying the second appointment may include receiving a request to schedule a second appointment within a calendar application. The calendar application uses the above-described techniques to identify the geographic location of the second appointment 120. In doing so, the calendar application realizes that the geographic location of the second appointment 120 is U.S. Patent and Trademark Office without a specific address. As such, the calendar application identifies a need for identifying an address associated with the U.S. Patent and Trademark Office. To this end, the calendar application may use an exemplary process 300A illustrated by FIG. 3A and an exemplary UI 300B illustrated by FIG. 3B to determine the address associated with the U.S. Patent and Trademark Office.

Process 300A begins with determining that the user has not specified an address corresponding to an appointment location (310). To do so, in one implementation, the calendar application searches the calendar application for the address associated with the appointment. For example and as noted above, the calendar application may reference a location field associated with the second appointment 120 to determine the address for the second appointment 120. Alternatively or additionally, the calendar application may reference other fields associated with the second appointment 120 and may search for key words (e.g., a zip code, city, and/or state name) identifying an address. In the absence of such information, the calendar application concludes that the user has not specified an address for the appointment location.

Upon identifying that the user has not specified an address for the appointment location, the calendar application attempts to determine the address associated with the appointment location (320). To do so, the calendar application may solicit the user for such information. In one example, the calendar application presents the UI 300B to the user, which includes an "address" icon, allowing the user to specify an address for the appointment location (e.g., U.S. Patent and Trademark Office). In one example, the selection of the "address" icon launches another UT, allowing the user to specify the address for the appointment. The user may manually enter the address in the UI or may import the address into the UI from the user's profile. For example, the user's profile may include an entry for "U.S. Patent and Trademark Office" that specifies the address for "U.S. Patent and Trademark Office." The profile may include the user's contact/address list. Alternatively, the calendar application may automatically determine the address for the U.S. Patent and Trademark Office without having the user to interact with the UI 300B. For example, the calendar application automatically obtains the address for U.S. Patent and Trademark Office from the user's profile.

Alternatively, the calendar application may access an online resource (e.g., Internet) to perform a web search or a database search to determine the address for the U.S. Patent and Trademark Office. In this manner and in one specific example, after performing the search, the calendar application identifies multiple addresses associated with the appointment.

To ensure the correct address is used, the calendar application may present another UI to the user and may request that the user selects from among the multiple addresses associated with the appointment location. Upon identifying the address, the calendar application allows the user to obtain directions to the appointment location (320). To this end, the calendar application includes a directions/mapping selection portion 325 in the UI 300B, selection of which provides the user with directions and/or maps to the geographic location of the second appointment 120 from the geographic location of the first appointment 115.

Along these lines, the process 200 includes the calendar application identifying a route extending from the geographic location of the first appointment to the geographic location of the second appointment (230). To do so, in one implementation, the calendar application has a built in navigation component, allowing it to generate directions from the geographic location of the first appointment 115 to the geographic location of the second appointment 120. In another implementation and as noted above, the calendar application communicates the location information for each appointment to a navigation application that is physically or logically distinct from the calendar application and requests, from the navigation application, that it identifies the travel route and the travel time associated therewith. The U.S. patent application Ser. No. 11/618,069, filed on Dec. 29, 2006 and entitled "Communicating Appointment And/Or Mapping Information Among A Calendar Application And A Navigation Application," describes in detail concepts that effect communications of appointment information from a calendar application to a navigation application for generating a travel route and a travel time associated therewith. The entire content of this application is incorporated herein by reference.

After identifying the travel route, the calendar application identifies a travel time associated with the route (235). The travel time may take into account the current road conditions and it may be updated as the current road conditions changes, as described in more detail below with respect to FIGS. 8A and 8B. Alternatively or additionally, the travel time may take into account the historic traffic flow.

Moving forward, the calendar application determines an amount of unscheduled time between the first and second appointments (240) to determine whether the amount of unscheduled time can sustain the travel time. To do so, in one implementation, the calendar application uses an exemplary process 400 illustrated by FIG. 4.

Figure 4:
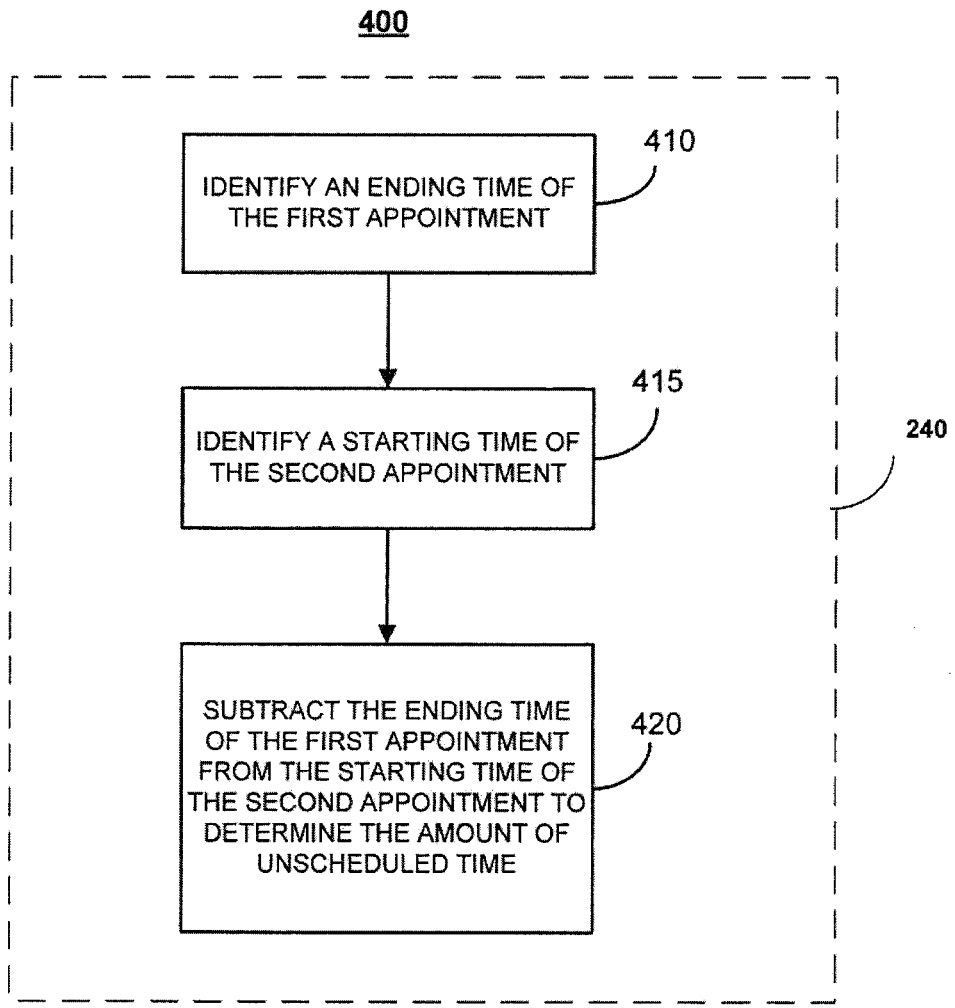
FIG. 4 illustrates an exemplary process for identifying an amount of unscheduled time between two appointments (e.g., a first appointment and a second appointment).

FIG. 4 illustrates an exemplary process 400 for identifying an amount of unscheduled time between two appointments (e.g., the first appointment and the second appointment). The process 400 includes the calendar application identifying an ending time of the first appointment (410) and identifying a starting time of the second appointment (415). To do so, in one implementation, the calendar application references a time field within the calendar application to identify the time during which the appointment is scheduled to take place. Alternatively or additionally, the calendar application may reference other fields associated with the first and second appointments and may search for key words identifying time of each appointment. For example, the calendar application may search for key words, such as "starting time," "ending time," "from 10:00 am to 11:00 am," and other possible texts indicative of the time of the appointment.

In one scenario, the calendar application determines that the user has failed to identify a start or end time associated with either or both of the first and second appointments. In such scenario, the calendar application may use a UI (not shown) to solicit from the user the time associated with the appointment.

After identifying the ending time associated with the first appointment and the starting time associated with the second appointment, the calendar application subtracts the ending time of the first appointment from the starting time of the second appointment to determine the amount of unscheduled time (420).

After identifying the amount of unscheduled time, the calendar application determines whether the amount of unscheduled time equals or exceeds the travel time (245). If so (250, yes), the calendar application reserves, within the calendar application, a time block to account for the travel time (255).

Upon determining that the amount of unscheduled time exceeds the travel time, in one implementation, the calendar application determines whether the amount of unscheduled time exceeds the travel time by more than a threshold amount. And, if it is determined that the amount of unscheduled time exceeds the travel time by more than the threshold amount, the calendar application provides a message that informs a user of the unscheduled time period. Along these lines, the calendar application also may provide the user with suggestions as to how the user should fill in the identified gap between the user's first and second appointments. This may help the user to more efficiently manage the unscheduled times within the user's daily calendar.

FIG. 5 illustrates an exemplary UI 500 used to inform the user of the unscheduled time in the user's calendar. The user interface 500 alerts the user that "even after taking into account the travel time from the first appointment to the second appointment, there remains an unscheduled time period in [the user's] calendar between the first and second appointments." And, the UI 500 prompts the user to request more information, such as, for example, whether the user wishes to spend more time at the preceding or subsequent appointment, to stop at another place (e.g., a gas station), to start traveling toward the next appointment, or to do "other" activities, such as to go to a coffee shop and/or a grocery store In particular, the UI 500 includes an option that allows a user to search for a particular type or point of interest (e.g., a coffee shop) near a user-identified destination. For example, by selecting (e.g., "clicking on") the "destination" link, the UI 500 generates another UI (not shown) that allows the user to specify a geographic location for the coffee shop. In one implementation, the geographic location for the coffee shop includes a specific address. In another implementation, the geographic location includes a parameter/proximity within which the point of interest should be located. For example, the user may draw a geographical designation proximate to or around the travel route, thereby indicating an interest in the point of interest located within the parameter. As such, these options allow the user to perform a more limited geographical search for a particular point of interest.

In another slightly different implementation, after the user identifies the point of interest, the calendar application automatically searches and identifies a geographic location for the point of interest within the vicinity of the travel route extending from the geographic location of the first appointment to the geographic location of the second appointment. Along these lines, the calendar application may provide the user with a UI (not shown) that displays a travel route extending from the geographic location of the first appointment to the geographic location of the second appointment, identifies the geographic locations associated with the point of interest along the route, and requests, from the user, to select, from among the identified geographic locations, a location for the point of interest.

Referring again to FIG. 2, if it is determined that the travel time exceeds the amount of unscheduled time (250, no), the calendar application alerts the user of the conflict and provides the user with one or more suggestions to resolve the conflict. In one example, the calendar application presents to the user a UI, providing one or more suggestions to make able the user to respond to the alert message. The process associated with generating an alert message is more fully described below with respect to FIG. 9A and the UI providing the user with one or more suggestions is more fully described below with respect to FIG. 9B.

In one implementation, the calendar application is configured to allow the user to set a travel time reminder, reminding the user to leave the user's current location at a specified time that precedes the starting time of the appointment by at least the travel time to the appointment. In keeping with the previous example described with respect to FIGS. 1A and 1B, the calendar application is configured to allow the user to set a travel time reminder, reminding the user to leave at a specified time that precedes the starting time (e.g., 1:00 pm) of the second appointment 120 by at least the travel time (e.g., 60 minutes) to the second appointment 120.

FIG. 6 illustrates an exemplary UI 600 that makes able the user to set such reminders within a calendar application. The UI 600 includes a reminder selection portion 610. The reminder selection portion 610 includes one or more options selection of which instruct the calendar application to remind the user at a "specified time" in advance of the allocated travel time block to arrive at a geographic location of the second appointment on time. In one example, the user's selection of the reminder selection portion 610 launches another UI (not shown), allowing the user to set the "specified time." For example, the user may request to be reminded about an appointment 10 minutes before the time the user should leave the user's present location to arrive at the appointment location on time. The reminder selection portion 610 also allows the user to specify the manner in which the reminder should be sent to the user. As shown in FIG. 6, the user may choose to receive the reminder via, for example, via an audio call placed to a telephone, an email, an instant message, and/or "other" options, such as short message service ("SMS").

The calendar application may be configured to allow the user to set alert messages, alerting the user about different events. In one specific example, the user may wish to set an alert message, alerting the user if the travel time associated with the calculated route between the first appointment and the second appointment changes due to a change in the current road conditions. In another example, the user may wish to set an alert message, alerting the user about conflicting appointments. In keeping with the previous example, the timing of the first and second appointments that previously did not conflict with each other even after taking into account travel time from the first appointment to the second appointment, may now present a conflict due to the new calculated travel time and the alert message informs the user of the same. In yet another example, the user may set an alert message, alerting the user of an unscheduled within the user's calendar application. In yet another example, the user may set an alert message, providing the user with updated directions and an updated travel time if the user deviates from the previously calculated route.

FIG. 7 illustrates an exemplary UI 700 used to allow the user to set an alert message, alerting the user of certain predefined conditions/events. The UI 700 includes an alert selection portion 710. As shown, the alert selection portion 710 includes four user-selectable alert options. The first alert option, described below in more detail with respect to FIGS. 8A and 8B, alerts the user if current road conditions change and may suggest an alternate route to the user that avoids problematic routes associated with the change in the road conditions. The second alert option, described below in more detail with respect to FIGS. 9A-9C, alerts the user about conflicting appointments (e.g., absence of sufficient travel time between the appointments) and may suggest possible options to help the user avoid the conflicting appointments.

The third alert option, described above in more detail with respect to FIG. 5, alerts the user about a time period that is unscheduled between the user's appointments and may suggest an alternate schedule to help the user to more efficiently use the unscheduled time slot. The fourth alert option, described below with respect to FIGS. 10A and 10B, alerts the user if the user deviates from the previously calculated route and provides the user with new directions based on the user's present location. More particularly, the user's selection of the fourth alert option instructs the calendar application to update the calculated route based on real time information, such that a user deviating from the original route may receive an updated route (an updated effect on a calendar of appointments) to the user's next appointment location.

Figure 8A:
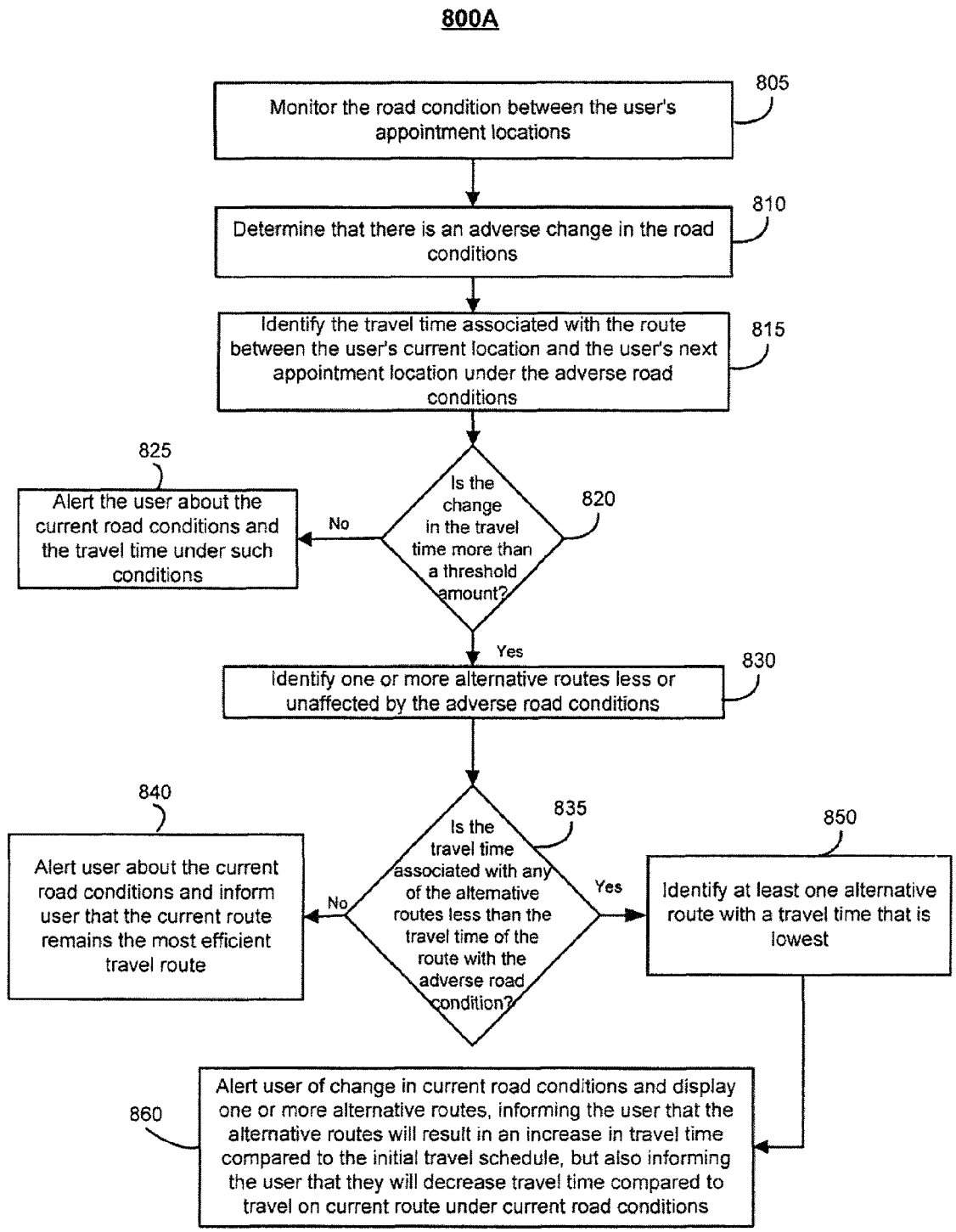
FIG. 8A illustrates an exemplary process used to alert a user about a change in current road conditions.

FIG. 8A illustrates an exemplary process 800A that a calendar application uses to alert a user about a change in current road conditions. In keeping with the previous example and for convenience, the calendar application described with respect to FIGS. 1A and 1B is referenced as performing the process 800A. In particular, the process 800A involves the first appointment 115, the second appointment 120, the control icon 125, and the travel time block 130. Although the process 800A is described below as being performed by the calendar application, it should be understood that it can be performed by a navigation application. Alternatively or additionally, some of the actions within the process 800A may be performed by the calendar application and others may be performed by the navigation application. Alternatively or additionally, the process 800A may be performed by an application that acts as an interface between the navigation and calendar applications.

Moving forward with the calendar application performing the actions of the process 800A, the calendar application may use the process 800A, for example, in response to the user's selection of the first alert option in the alert selection portion 710 illustrated by FIG. 7. Alternatively or additionally, the calendar application may use the process 800A in response to the user's selection of the control icon 125. In either case, the process 800A includes the calendar application monitoring the road conditions between the user's appointment locations (805). For example, the calendar application monitors the road conditions associated with the previously calculated travel route extending from the geographic location of the first appointment 115 to the geographic location of the second appointment 120. To do so, in one implementation, the calendar application regularly contacts a server that includes traffic data to obtain current road conditions between the user's appointments. To minimize the burden on the server initially, the calendar application may contact the server less frequently and, as it gets closer to the time the user has to leave the geographic location of the first appointment 115 to arrive on time at the geographic location of the second appointment 120, the calendar application contacts the server more often to obtain more up to date information.

Regardless, the calendar application determines that there is a change in the road conditions (810). The change in the road conditions may include events such as traffic, accidents, rush hours, construction, road blocks, and/or adverse weather conditions resulting in a slower recommended speed limit. The calendar application identifies the updated travel time associated with the travel route under the current road conditions (815). The calendar application then compares the updated travel time under the changed road conditions with the travel time under normal conditions to determine if they differ by more than a threshold amount (820). For example, the calendar application compares the updated travel time with the travel time specified in the travel time block 130. If they do not differ by more than the threshold amount (820, no), the calendar application alerts the user about the current road conditions and the updated travel time under such conditions (825). In one example, the calendar application updates the travel time block 130, within the calendar application interface II 0, to account for the updated travel time. If the change in travel time is more than the threshold amount (820, yes), the calendar application identifies one or more alternative routes that are less or unaffected by the adverse road conditions and the travel time associated therewith (830). In another implementation, the calendar application informs the user of the adverse condition and solicits from the user as to whether the user wishes to identify an alternative route. Upon receiving an indication from the user that the user wishes to identify an alternative route, the calendar application identifies one or more alternative routes or determines that an alternative route that is less or unaffected by the adverse road conditions does not exist.

To identify an alternative route, the calendar application attempts to find a route that avoids the adverse events (e.g., accidents) resulting in the change in the road conditions for the previously calculated route. The calendar application checks to determine whether the travel time associated with any of the alternative routes is less than the travel time associated with the route with the adverse conditions (835). If not (835, no), the calendar application alerts the user about the current road conditions and informs the user that their current route remains the most efficient travel route (825).

If the travel time associated with any of the alternative routes is less than the travel time associated with the original route facing the adverse road condition (835, yes), the calendar application identifies at least one alternative route with a travel time that is lowest (e.g., a route with the least travel time). The calendar application may identify the at least one alternative route with a travel time that is lowest by comparing the travel times of the identified alternative routes and selecting, from among the identified alternative routes, the alternative route with the lowest travel time. The calendar application may select more than one alternative route when two routes have the same travel time that is also the lowest travel time or when the calendar application is configured to present options to the user by selecting multiple routes (e.g., the two alternative routes, from among the identified alternative routes, with the two lowest travel times). In response to identifying the at least one alternative route with a travel time that is lowest, the calendar application alerts the user of the change in the current road conditions and displays to the user the one or more identified alternative routes, informing the user that the alternative routes will result in an increase in travel time compared to the initial travel schedule, but also informing the user that they will decrease travel time compared to travel time on the current route under the current road conditions (860).

To alert the user, the calendar application may display to the user a UI informing the user of the time, present location, and the adverse condition, and suggesting that the user takes a different route to the user's next appointment location. Alternatively or additionally, the calendar application may store the directions associated with the new route in the travel time block 130 for later access by the user and may update the travel time associated with the new route.

FIG. 8B illustrates an exemplary UI 800B the calendar application uses to alert a user about a change in current road conditions. The UT 800B informs the user of the present time (e.g., 11:00 am), the user's present location (e.g., the first appointment location), and the user's next destination (e.g., the second appointment location). As shown in FIG. 8B, the UT 800B also informs the user that if the user were able to travel under normal conditions, the user could expect to arrive at the second appointment location in 60 minutes. However, problematic conditions adversely affect the ability of the user to achieve that estimated travel time. In particular, the alert message indicates that "[t]here is heavy traffic due to an accident on the I-60" and now it will take the user 3 hours to arrive at the second appointment location.

In one implementation, to estimate the new travel time, the calendar application compares the travel time of the original route under the current road conditions with the travel time of an alternative route and suggests to the user the route with the minimum travel time. For example and as shown in FIG. 8B, the calendar application determines the alternative route has the minimum travel time (e.g., 2 hours) and suggests taking the alternative route. The calendar application also communicates to the user to leave immediately if the user wishes to arrive at the second appointment location on time. The UI 800B also makes able the user to view the alternative route via, for example, selecting the "view" icon. Alternatively or additionally, the user can view the alternative route via, for example, selecting the travel time block 130. It is to be understood that other alternative may be presented to the user. For example, the user may be presented with an option to postpone and/or cancel the second appointment and inform the participants of the second appointment of the same.

Figure 9A:
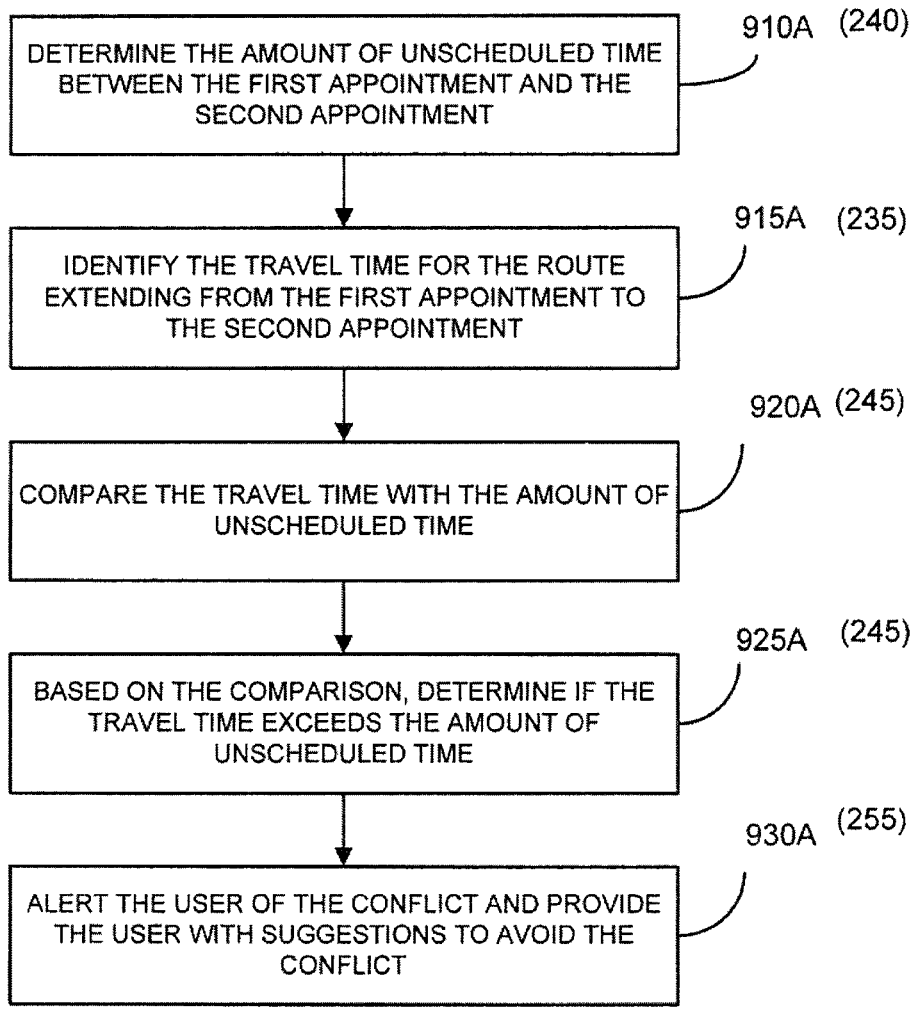
FIG. 9A illustrates an exemplary process used to alert a user about conflicting appointments.

FIG. 9A illustrates an exemplary process 900A used for generating an alert message informing the user of conflicting appointments. The actions performed by the process 900A are similar to some of the actions performed by the process 200 illustrated by FIG. 2. In keeping with the previous example and for convenience, the calendar application described with respect to FIGS. 1A and 1B is referenced as performing the process 900A. In particular, the process 900A involves the first appointment 115, the second appointment 120, the control icon 125, and the travel time block 130. Although the process 900A is described below as being performed by the calendar application, it should be understood that it can be performed by a navigation application. Alternatively or additionally, some of the actions within the process 900A may be performed by the calendar application and others may be performed by the navigation application. Alternatively or additionally, the process 900A may be performed by an application that acts as an interface between the navigation and calendar applications.

The process 900A may be used, for example, in response to the user's selection of the control icon 125. Alternatively or additionally, the process 900A may be used, for example, in response to the user's selection of the second alert option in the alert selection portion 710 illustrated by FIG. 7. In either case, the process 900A includes the calendar application determining the amount of unscheduled time between the first appointment 115 and the second appointment 120 (910A). The action (910A) is similar to action (240). To this end and as more fully described above with respect to process 400 illustrated by FIG. 4, the calendar application identifies that the amount of unscheduled time is about 2 hours. The calendar application then identifies the travel time for the route extending from the geographic location of the first appointment 115 to the geographic location of the second appointment 120 (915A). The action (915A) is similar to action (235). For example, the calendar application identifies that the travel time is 2 hours and 30 minutes.

The calendar application then compares the travel time with the amount of unscheduled time (920A) and based on the comparison, determines if the travel time exceeds the amount of unscheduled time (925A). The actions (920A) and (925A)

illustrate action (245) in more detail. In keeping with the above-described example, the calendar application identifies that the travel time exceeds the amount of unscheduled time by 30 minutes. Accordingly, the calendar application alerts the user of the conflict and provides the user with suggestions to avoid the conflict (930A). The action (930A) is similar to action (255). For example, the suggestions include ending the first appointment 115 sooner than the scheduled ending time and/or canceling or rescheduling the first or the second appointment 115, 120. The alert and the suggestions may be presented to the user via a UI.

FIG. 9B illustrates an exemplary UI 900B used to alert a user about conflicting appointments. The UI 900B may be presented to the user automatically as a part of a regular morning update schedule, alerting the user if there are conflicting appointments in the user's calendar. Alternatively or additionally, the UI 900B may be presented to the user at the time the user selects (e.g., clicks on) the control icon 125. The UI 900B notes that the first appointment at 10:00 am is supposed to last for 60 minutes and the second appointment is at 12:00 pm. The UI 900B also notes that "it takes 120 minutes to arrive at the second appointment location from the first appointment location plus an approximate 10 minutes to get from the car to the meeting."

The UI 900B displays to the user several options to address this conflict. The first option allows the user to spend less time at the first appointment. The second option allows the user to cancel or reschedule the "second appointment". The third option informs the calendar application of the user's preference to arrive late to the second appointment. Other attendees then may be notified that the user will be arriving late. The UI 900B may be interactive, such that the user is allowed to cancel or reschedule another appointment instead of the second appointment. For example, the user's selection of the "second appointment," launches another UI (not shown), allowing the user to select an appointment to be canceled or rescheduled.

Figure 9C:
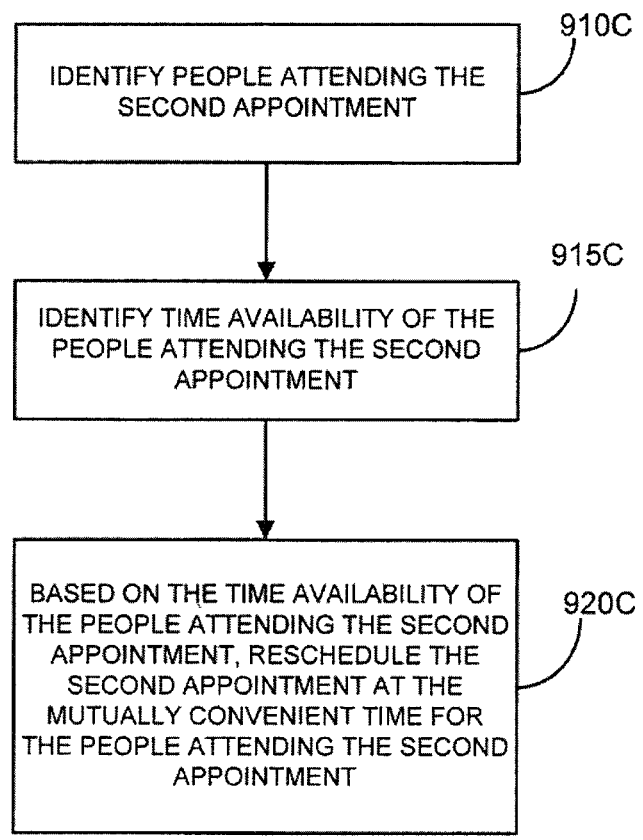
FIG. 9C illustrates an exemplary process used for rescheduling an appointment at a mutually convenient time for the people attending the appointment.

Upon identifying that the user wishes to reschedule the second appointment 120, the calendar application may identify the participants of the second appointment 120 and their time availability to reschedule the second appointment 120 at a mutually convenient time for the participants of the second appointment 120. FIG. 9C illustrates an exemplary process 900C used for rescheduling the appointment 120 at a mutually convenient time for the people attending the appointment 120.

Process 900C includes the calendar application identifying participants of the second appointment 120 (910C). In one example, the calendar application searches participant field to identify the participants of the second appointment 120. After identifying the participants, the calendar application identifies time availability of each of them (915C). To do so, in one implementation, the calendar application remotely accesses, over a wireless network, a calendar application of each of the participants to identify their time availability. In another implementation, the calendar application sends an e-mail to each of the participants and requests from each of them to identify his/her time availability. In either case, based on the time availability of the participants, the calendar application reschedules the second appointment 120 at the mutually convenient time for the participants of the second appointment 120 (920C) and informs the participants of the same.

Figure 10A:
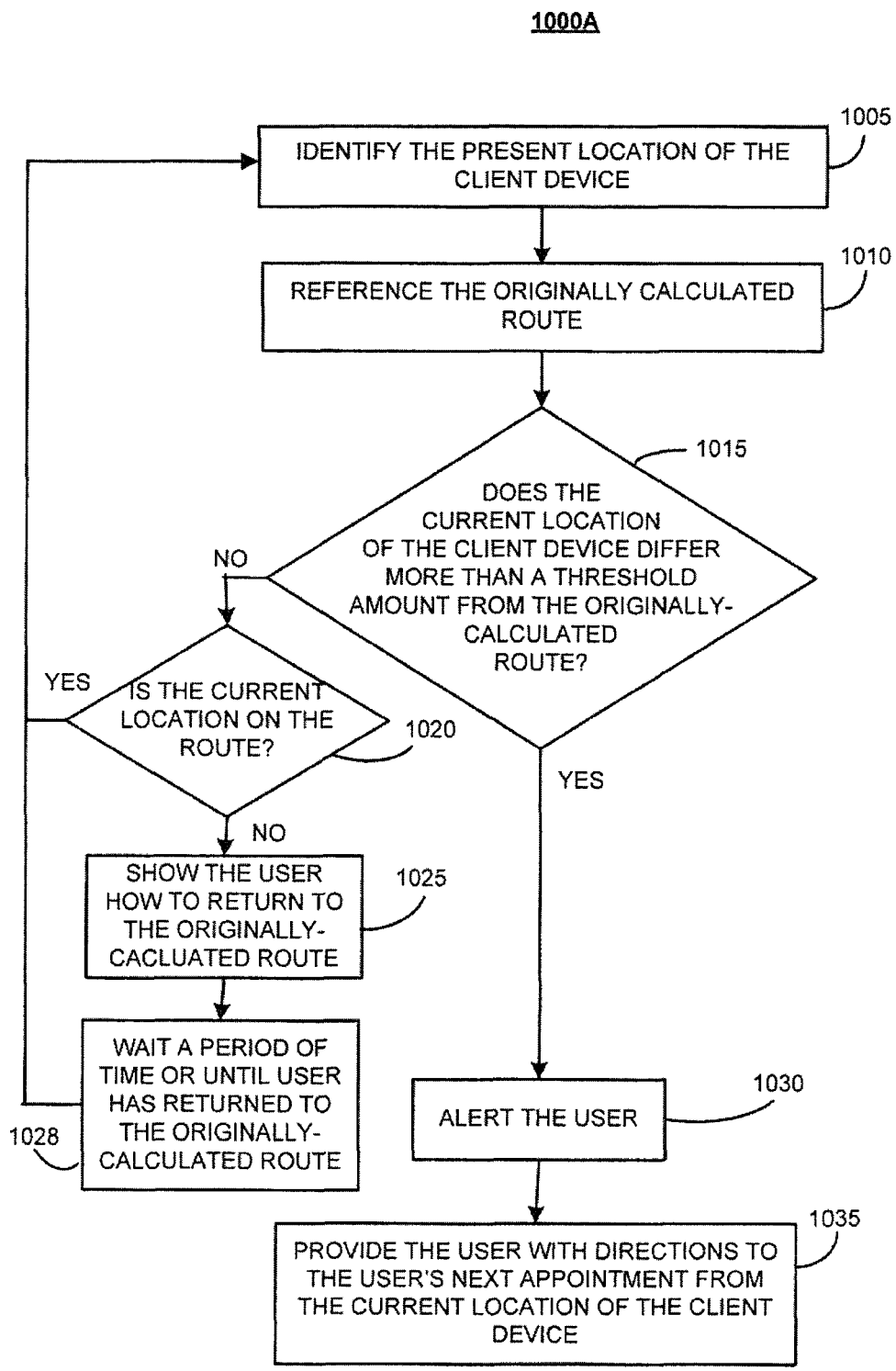
FIG. 10A illustrates an exemplary process used to alert a user that the user has deviated from an original route.

FIG. 10A illustrates an exemplary process 1000A used to alert a user that the user has deviated from an original route. In keeping with the previous example and for convenience, the calendar application described with respect to FIGS. 1A and 1B is referenced as performing the process 1000A. In particular, the process 1000A involves the first appointment 115, the second appointment 120, the control icon 125, and the travel time block 130. Although the process 1000A is described below as being performed by the calendar application, it should be understood that it can be performed by a navigation application. Alternatively or additionally, some of the actions within the process 1000A may be performed by the calendar application and others may be performed by the navigation application. Alternatively or additionally, the process 1000A may be performed by an application that acts as an interface between the navigation and calendar applications.

The process 1000A may be used, for example, in response to the user's selection of the fourth alert option in the alert selection portion 710 illustrated by FIG. 7. Alternatively or additionally, the process 1000A may be used, for example, in response to the user's selection of the control icon 125. In either case, the process 1000A includes the calendar application, including a navigation component, identifying the present location of the client device. In one implementation, the calendar application automatically determines the present location of the user using location providing technology implemented in the user's client device. If the client device is equipped with multiple location providing technologies, the calendar application may use the technology that provides the most accurate information about the present location.

In one example, the client device includes a mobile device that is GPS-enabled, and the calendar application automatically determines the present location of the user based on the GPS position of the client device. In another example, the present location of the user is automatically determined by registering the client device with a host (e.g., a Session Initiation Protocol ("SIP")) server. The client device may provide information to the host that is used to derive location information. For example, the host may derive location information based on how the client device is accessing the network (e.g., as identified by source IP address or another packet identifier).

In yet another alternative, the present location of the user is automatically determined from the user's profile. For example, the user has associated profile or contact information indicating a predetermined home and/or office location. In one specific example, the user of a client office computer has previously stored the location of the user's office in the user's profile. Thus, the navigation application uses the user's profile to determine the office location.

Upon determining the current location, the calendar application references the originally calculated route (1010) and checks to determine whether the current location of the user differs more than a threshold amount from the originally-calculated route (1015). If not (1015, no), the calendar application checks to determine whether the current location is on the route (1020) and if so (1020, yes), the calendar application continues to monitor the current location of the user to account for the possible departure of the user from the route. If, however, the current location of the user is not on the route (1020, no), the calendar application shows the user how to return to the originally-calculated route (1025). FIG. 10C illustrates a UI 1000C that may be used to help the user to return to the originally-calculated route. After showing the user how to return to the originally-calculated route, the calendar application waits a period of time (e.g., a predetermined and configurable period of time, a time determined based on the distance from the originally-calculated route, etc.) or until the user has returned to the originally-calculated route, and continues to monitor the current location of the user to account for departure of the user from the originally-calculated route (1028).

If the current location of the user does differ more than a threshold amount from the originally-calculated route (1015, yes), the calendar application alerts the user (1030). In one example, the threshold is 1 mile from the originally calculated route. If the current location of the client device differs more than the threshold amount from the originally calculated route, the calendar application alerts the user (1030) and provides the user with directions to the user's next appointment location from the current location of the client device (1035). Although FIG. 10A illustrates that actions (1030 and 1035) are performed serially, it is possible that actions (1030 and 1035) can be performed simultaneously.

The calendar application may use a UI, such as the one shown in FIG. 10B, to alert the user and provide the user with updated directions. As described further below with respect to FIG. 10B, the alert message also informs the user of the time and location of the user's next appointment and the travel time to the next appointment location based on the user's present location.

FIG. 10B illustrates an exemplary UI 1000B used to alert a user that the user has deviated from an original route. In particular, the alert message notes to the user that "it is currently 11:00 am, and it seems you have deviated from the original route. You are presently located at 1100 F St., NW, Washington D.C. 20005."

The alert message also informs the user of the time and location of the user's next appointment (e.g., the second appointment 120) and the travel time (e.g., 30 minutes) to the next appointment location based on the present location of the user. The alert message also allows the user to view directions from the present location to the next appointment. In one implementation, the calendar application determines whether the user arrives ontime at the user's next appointment based on the new travel time and informs the user in either case. If the user is going to be late to the appointment based on the new travel time, the calendar application may present the user with one or more suggestions to avoid such conflict. For example, the calendar application may present the user with options similar to those described with respect to FIG. 9B.

FIG. 10C illustrates an exemplary UI 1000C used to alert the user that the user has deviated from the originally-calculated route by less than a threshold amount and helps the user to get back on the originally-calculated route. In particular, the alert message notes to the user that "it is currently 11:00 am, and it seems you have deviated from the originally calculated route by less than a threshold amount." In keeping with the example described with respect to FIG. 10A, the user who is presented with the UI 1000C may have deviated from the route by less than a threshold amount (e.g., 1 mile). Regardless, the alert message 1000C allows the user to view directions in order to get back on the originally-calculated route.

Other implementations are also contemplated. For example, instead of or in addition to allowing the user to a reserve, within a calendar application, a time block for the travel time between multiple appointments after the multiple appointments have already been scheduled, as described with respect to FIG. 2, the user is allowed to reserve, within the calendar application, a time block for such travel time during scheduling of an appointment. As such, in this implementation, the user immediately realizes the conflict (e.g., absence of sufficient travel time between appointments) at the time of scheduling an appointment, and the user is allowed to schedule the appointment at another time to avoid such conflict. This minimizes the hassle of later recognizing such conflict and having to reschedule the already scheduled appointment at that time.

Figure 11:
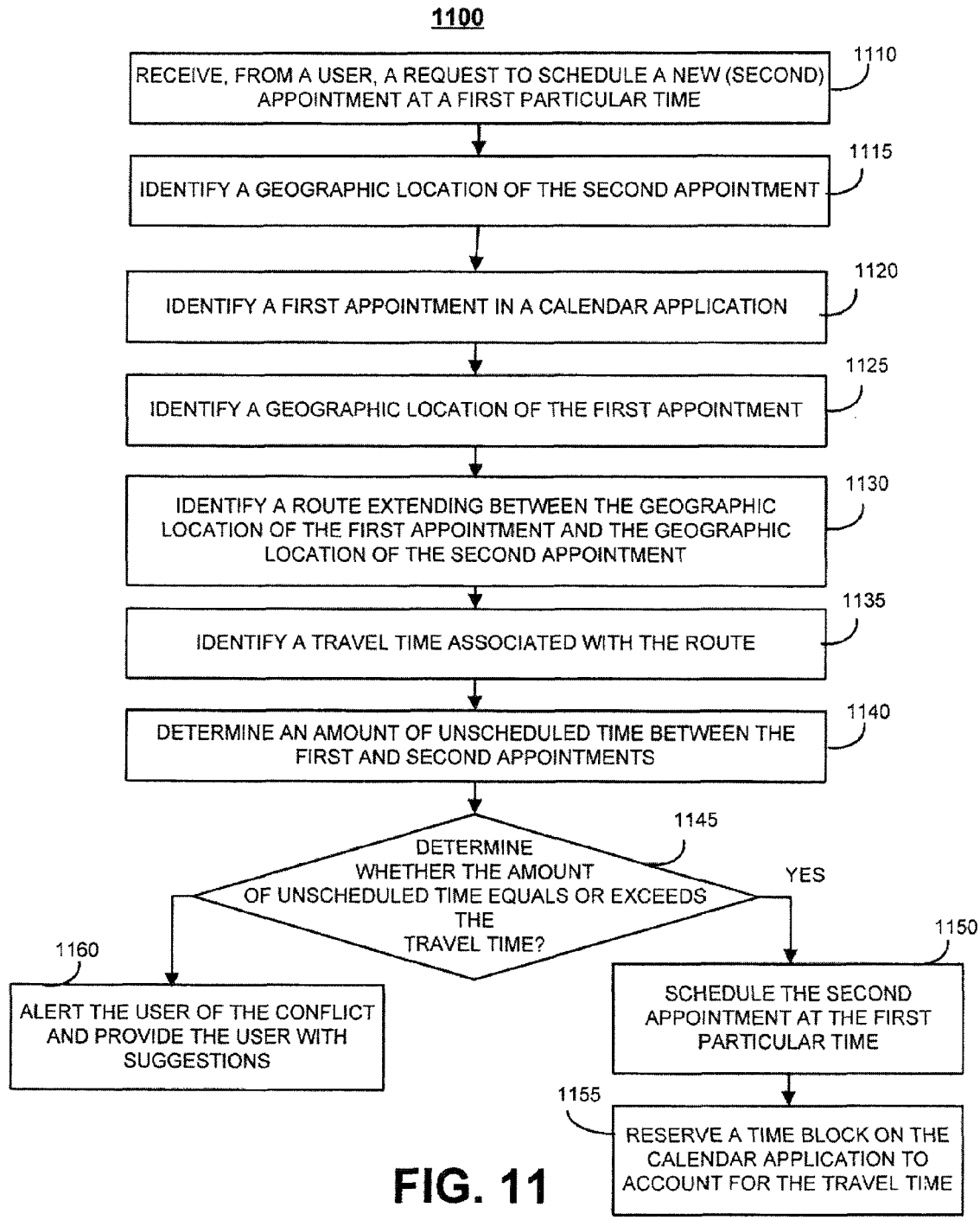
FIG. 11 illustrates an exemplary process used to make able a user to determine presence or absence of a conflict (e.g., absence of sufficient travel time) between an already scheduled first appointment and a second and new appointment that the user wishes to schedule at a particular time.

FIG. 11 illustrates an exemplary process 1100 used to make able a user to determine presence or absence of a conflict (e.g., absence of sufficient travel time) between an already scheduled first appointment and a second and new appointment that the user wishes to schedule at a particular time. In keeping with the previous example and for convenience, the calendar application described with respect to FIGS. 1A and 1B is referenced as performing the process 1100. In particular, the process 1100 involves the calendar application interface 110, the first appointment 115, the second appointment 120, the control icon 125, and the travel time block 130.

Although the process 1100 is described below as being performed by the calendar application, it should be understood that it can be performed by a navigation application. Alternatively or additionally, some of the actions within the process 1100 may be performed by the calendar application and others may be performed by the navigation application. Alternatively or additionally, the process 1100 may be performed by an application that acts as an interface between the navigation and calendar applications.

The process 1100 includes many of the actions described with respect to the process 200. As such, for the sake brevity, only the actions that are different is described here in more detail. These actions include actions (1110, 1150, 1155, and 1160). To illustrate, the process 1100 includes the calendar application receiving, from a user, a request to schedule, within a calendar application, a new (second) appointment 120 at a particular time (1110). To formulate such a request, in one implementation, the user clicks on the time windows appearing on the calendar application interface 1110. This results in generation of a UI, similar to the one shown and described below with respect to FIG. 12C, soliciting, from the user, to specify the time, date, subject, and location of the second appointment 120. After identifying this information, the user may save the second appointment 120 within the calendar application by selecting the "save and close" icon.

Before saving the second appointment 120 into the calendar application, however, the calendar application may first determine whether the proposed second appointment present a conflict (e.g., absence of sufficient travel time) with an already scheduled first appointment 115. If not (1145, yes), the calendar application schedules the second appointment 120 at the proposed particular time (1150). Additionally, the calendar application also reserves a travel time block within the calendar application to account for the travel time (1155). In one implementation, the calendar application places the travel time block immediately before the starting time of the second appointment. In another implementation, the calendar application places the travel time block immediately after the ending time of the first appointment. In yet another implementation, the calendar application presents to a user a UI (not shown), allowing the user to select where the time block should be located between the first and second appointments. In either case, the user may have the option of removing and/or adjusting the travel time block placed between the first and second appointments.

However, if it is determined that the amount of travel time exceeds the amount of unscheduled time (1145, no), the calendar application alerts the user of the conflict and provides the user with suggestions before or at the time of saving the second appointment 120 into the calendar application at the particular time (1160). In one example, the calendar application presents to the user a UI, providing the user with one or more suggestions in resolving the conflict, as described above in more detail with respect to FIGS. 9A-9C. In response, the user may simply select to schedule the second appointment at another time that does not present such a conflict.

Figure 12A:
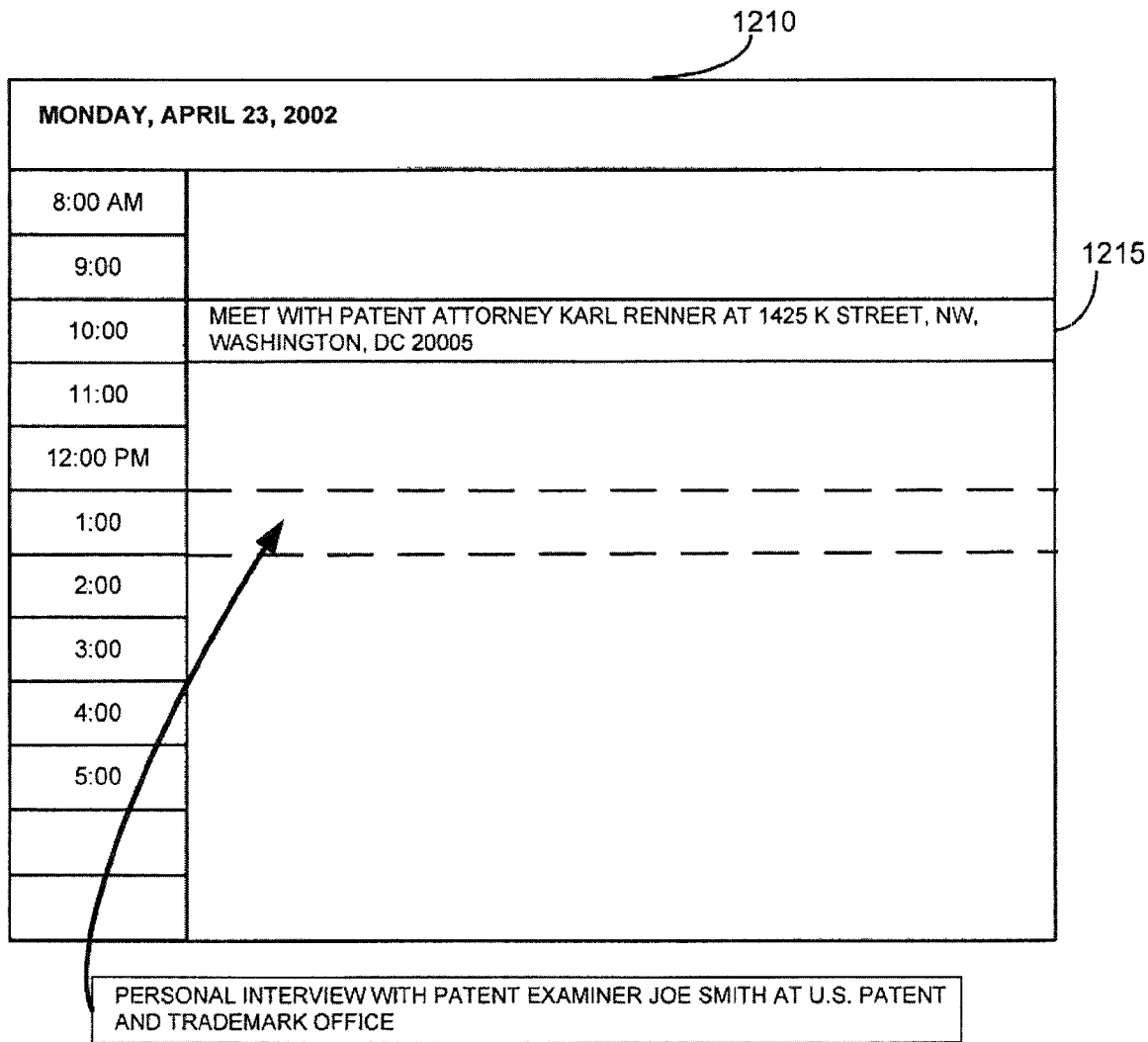

FIGS. 12A-12D illustrate, within the UIs 1200A-1200D, an exemplary sequence of interactions between a calendar application and a user wishing to schedule an appointment using the process 1100 described with respect to FIG. 11. FIG. 12A illustrates an exemplary UI 1200A enabling a user to perceive, within the calendar application, an already scheduled appointment and to schedule a new appointment in the absence of a conflict (e.g., absence of sufficient travel time) between the already scheduled appointment and the new appointment.

The UI 1200A includes a calendar application interface 1210. The calendar application interface 1210 includes, within a particular day (e.g., Monday, Apr. 23, 2002), an already scheduled first appointment 1215. As shown, the first appointment 1215 is with "patent attorney Karl Renner at 1425 K Street, NW, Washington D.C. 20005." Thereafter, the calendar application receives, from the user, a request to schedule a second and a new appointment 1220, which appears to be with "a patent examiner Joe Smith at U.S. Patent and Trademark Office." As shown, in one implementation, the request is in the form of drag and drop operation.

In particular, the user drags, from another application and into the calendar application interface 1210, the information about the second appointment 1220 and drops, within the calendar application interface 1210, the information about the second appointment 1220. In one particular example, the user drops this information within a particular time window (e.g., between 1:00 pm to 2:00 pm window). In another implementation described generally with respect to FIG. 12C, instead of using the drag and drop operation, the user simply selects (e.g., clicks on), for example, "new appointment" icon within the calendar application interface 1210 to schedule the second appointment 1220 and provides the calendar application with the information regarding the second appointment 1220.

In either case, after receiving the information about the second appointment 1220 and before or at the time of accepting/scheduling the second appointment 1220, the calendar application uses the exemplary process 1100 to determine whether the proposed timing of the second appointment 1220 presents a conflict (e.g., absence of sufficient travel time) with the already scheduled first appointment 1215. If not, the calendar application schedules the second appointment 1220 within the calendar application interface 1210 and also reserves, within the calendar application interface 1210, a travel time block associated with the travel time of the route extending between the first appointment 1215 and the second appointment 1220, as shown by FIG. 12B.

FIG. 12B illustrates an exemplary UI 1200B with the second appointment 1220 and the travel time block 1230 both scheduled within the calendar application interface 1210. The travel time block 1230 reserves, within the calendar application interface 1210, the identified time window for traveling. As noted above, in addition to reserving a time block to account for the travel time, the travel time block 130 provides the user with directions from the geographic location of the first appointment 1215 to the geographic location of the second appointment 1220.

Figure 12C:
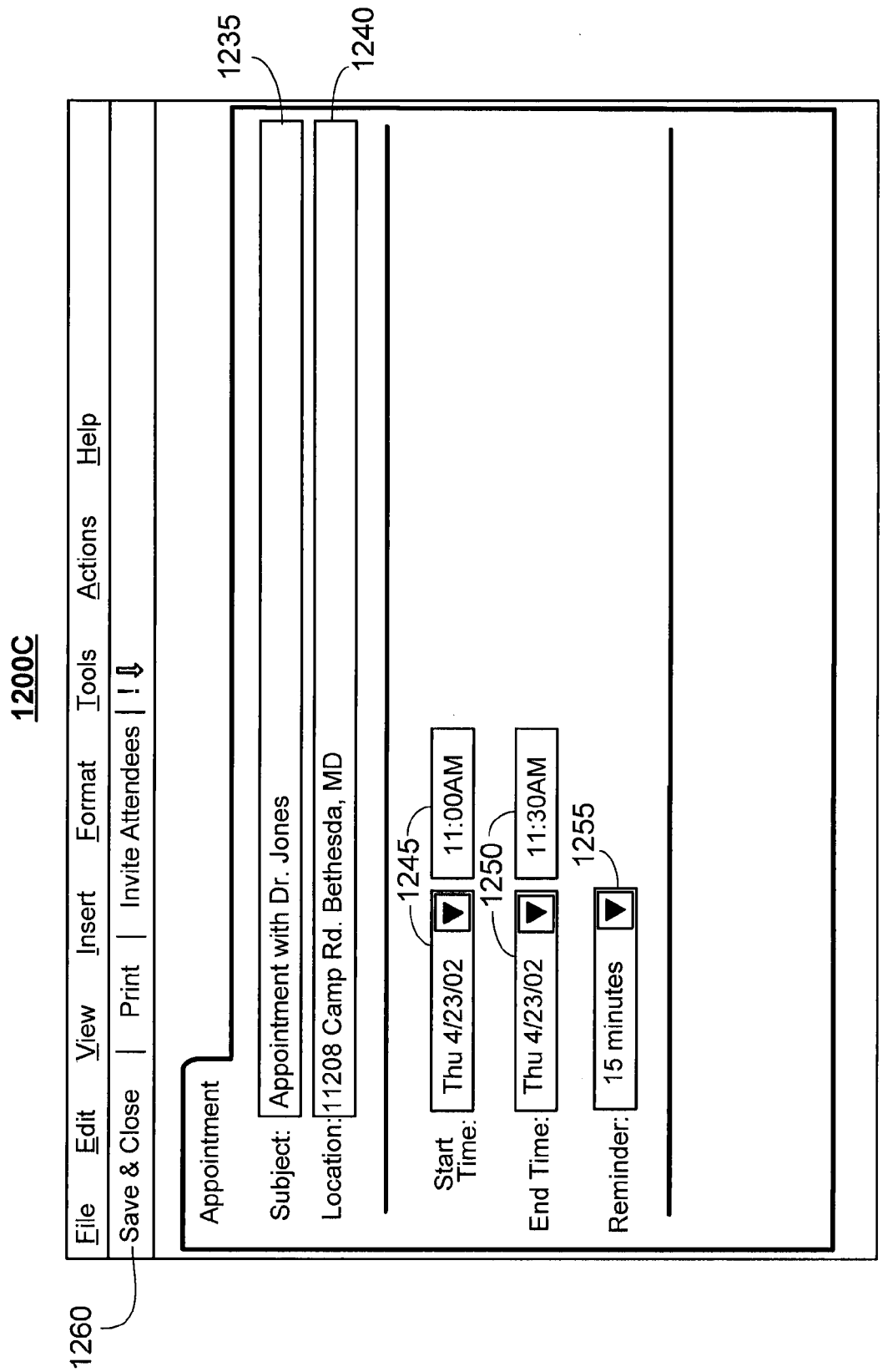

FIG. 12C illustrates an exemplary UI 1200C used to allow the user to schedule a third appointment within the calendar application interface 1210 using the process 1100. In one implementation, the UI 1200C is presented to the user in response to the user selecting (e.g., clicking on) a "new appointment" icon within the calendar application interface 1210. In another implementation, the UI 1200C is presented to the user in response the user selecting (e.g., clicking on) one of the time windows (e.g., 11:00 am to 11:30 am window) appearing within the calendar application interface 1210. In either case, the UI 1200C includes various fields for gathering information about the third appointment. The various fields include a subject field 1235, a location field 1240, a starting time field 1245, an ending time field 1250, and a reminder field 1255.

The subject field 1235 allows the user to identify the subject associated with the third appointment. For example, as shown, the subject associated with the third appointment includes "appointment with Dr. Jones." The location field 1240 allows the user to identifying the geographic location of the third appointment. For example, as shown, the geographic location of the new appointment is at "11208 Camp Rd. Bethesda, Md., 20854." The starting time and ending time fields 1245, 1250, identify the starting date/time and ending date/time associated with the third appointment, respectively. For example, as shown, the starting date/time of the third appointment is on Thursday, Apr. 23, 2002 at 11:00 am and the ending date/time of the third appointment is on Thursday Apr. 23, 2003 at 11:30 am. The reminder field 1255 allows the user to set a reminder for the appointment. For example, as shown, the user has specified a reminder 15 minutes in advance of the appointment time.

To schedule the appointment, the user may click on "save and close" icon 1260. This causes the appointment information to be saved within the calendar application, and the appointment information be presented on the calendar application interface 1210 between the first and second appointments 1215 and 1220, as shown in FIG. 12D. However, before or at the time of scheduling the third appointment 1265, the calendar application again uses the process 1100 to determine whether the timing of the third appointment 1265 present a conflict (e.g., absence of sufficient travel time) with the already scheduled first and second appointments 1215, 1220.

To this end, the calendar application automatically identifies a first route extending from the geographic location of the first appointment 1215 to the geographic location of the third appointment 1265 and identifies a first travel time associated with the first route. Similarly, the calendar application automatically identifies a second route extending from the geographic location of the third appointment 1265 to the geographic location of the second appointment 1220 and identifies a second travel time associated with the second route. The calendar application then compares the first travel time with the time gap between the first and third appointments 1215, 1265 and similarly compares the second travel time with the time gap between the third and second appointments 1265, 1220.

If the first travel time exceeds the time gap between the first and third appointments 1215, 1265 or the second travel time exceeds the time gap between the third and the second appointments 1265, 1220, the calendar application alerts the user before or at the time of accepting the third appointment 1265 at the requested time. As such, the user immediately realizes the conflict and is permitted to schedule the third appointment 1265 at another time to avoid the conflict. For example, and as shown, the calendar application generates a pop-up window 1270 informing the user of the conflict.

Alternatively, if the first travel time does not exceed the time gap between the first and third appointments 1215, 1265 and the second travel time also does not exceed the time gap between the third and second appointments 1265, 1220, the calendar application schedules the third appointment 1265 at the requested time.

Although FIG. 9B illustrates some of the suggestions that may be offered to the user to avoid the conflict between two appointments, other suggestions also are possible. For example, upon determining that two appointments are conflicting (e.g., there is an absence of sufficient travel time from the first appointment location to the second appointment location), the calendar application may offer to the user to default to a telephone or video conference to avoid the conflict. In keeping with the example described about with respect to FIG. 9B, upon realizing that the amount of unscheduled time between the first appointment and the second appointment is less than the travel time between the two, the calendar application may offer to the user to conduct either the first appointment or the second appointment via telephone.

Along these lines, at a time of scheduling an appointment, the user may be presented with an option to specify whether an appointment is to be conducted via a teleconference or a video conference. If so, the calendar application does not take into account that appointment for purposes of reserving a time block to account for the travel time. To illustrate, assume that the user has three appointments within the user's calendar on a particular day. The first appointment is to be conducted live at 10.00 am, the second appointment is to be conducted via a telephone conference at 11:00 am, and the third appointment is to be conducted live at 12:00 pm. The calendar application realizes that the second appointment is a teleconference or a video conference appointment, and, as such, the calendar application does not reserve a time block for travel time between the first appointment and the second appointment and similarly between the second appointment and the third appointment.

Instead, the calendar application reserves a time block to account for travel time from the first appointment to the third appointment. That is the calendar application intentionally disregards the second appointment for purposes of reserving a time block to account for the travel time. In one implementation, the user is informed that the travel time between the first and third appointment impinges on the scheduled second appointment that takes place via a teleconference, for example. And, the user is presented with an option to schedule the travel before, during, or after the intervening teleconference appointment.

In a slightly different implementation, instead of the user explicitly specifying that the appointment is a teleconference one, the calendar application infers such conclusion from the information associated with the appointment. In one example, if there is a dial-in number and/or a pin number associated with the appointment and thus, is location independent, the calendar application concludes that the appointment is to be conducted via a telephone, and, as such, does not take into account the appointment for purposes of identifying a travel time. In one implementation, the calendar application confirms with the user as to whether the appointment is indeed to be conducted via a telephone to reduce errors.

Similar to the notion of recognizing and accounting for telephone and/or video conference appointments, the calendar application also may recognize certain keywords (e.g., airports, flights) or locations (e.g., airports) associated with a calendar event, and may have a particular setting to set aside time in addition to the travel time to account for certain routine activities (e.g., going through security). Similarly, the calendar application may set aside time to account for other factors, such as, for example, time needed to get from the car to a meeting. In keeping with the example described above with respect to FIG. 9B, the calendar application notifies the user that the travel time between two appointments is 130 minutes (120 minutes of travel time plus an additional 10 minutes to get from the car to the meeting). As such, the calendar application reserves a time block for 130 to account for the time needed for the user to get from the car to the meeting.

Figure 12E:
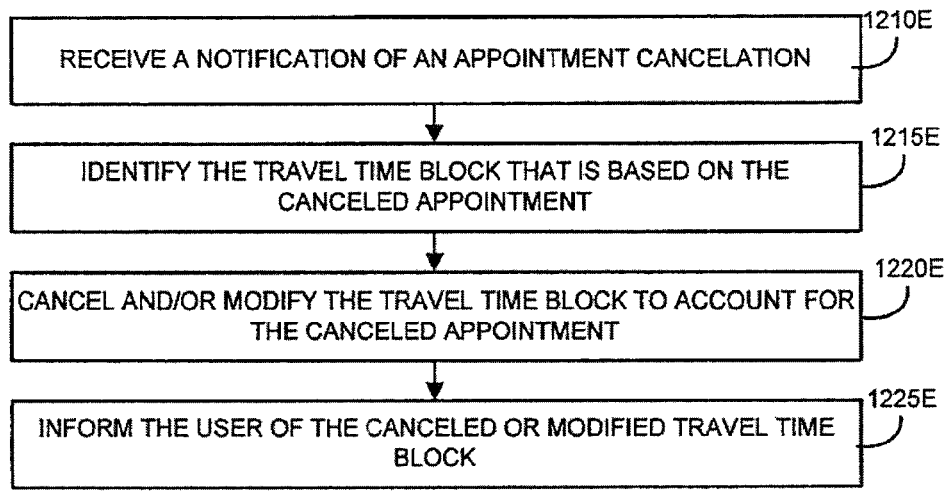
FIG. 12E illustrates an exemplary process used by a calendar application to cancel and/or modify a travel time block upon receiving an indication from a user to cancel an appointment that is used to estimate the travel time block.

In another implementation, the calendar application cancels or modifies the already scheduled travel time block upon determining that the user wishes to cancel an appointment used for the estimation of the travel time block. FIG. 12E illustrates an exemplary process 1200E used by the calendar application to cancel and/or modify the travel time block upon receiving an indication from the user to cancel an appointment that is used to estimate the travel time block.

The process 1200E includes receiving a notification of an appointment cancellation (1210E). In keeping with the example described with respect to FIG. 12D, the calendar application may receive a notification that the first appointment 1215 with the patent attorney Karl Renner should be canceled. Upon receiving such an indication, the calendar application identifies the travel time block that is based on the canceled appointment (1215E). Toward this end, the calendar application identifies the travel time block 1230 that is reserved for the travel time between the first appointment 1215 and the second appointment 1220. And, the calendar application either cancels or modifies the travel time block (1220E).

In one example, if the only remaining appointment is the second appointment 1220, the calendar application cancels the travel time block 1230. However, and as shown in FIG. 12D, if there is a third appointment 1265, the calendar application modifies the travel time block such that it is based on the third appointment 1265. Although, the third appointment 1265 is shown in FIG. 12D to take place after the first appointment 1215, it is to be understood that the third appointment 1265 can take place before the first appointment 1215. In either case, the calendar application identifies the new travel time block and informs the user of the same (1225E).

Other implementations are also contemplated.

What is claimed is:
1. A computer-implemented method for identifying a travel time between appointments, the method comprising:
identifying a first appointment at a first location in a calendar application;
identifying a second appointment at a second location that occurs later in time than the first appointment in the calendar application;
determining, with at least one processor, an expected mode of transportation from the first location to the second location, wherein the expected mode of transportation is determined based on at least one of keywords or geographic locations associated with the first and second appointments;
identifying a route extending from the first location to the second location based on the expected mode of transportation;
identifying a travel time associated with the route, based on the expected mode of transportation;
determining an amount of unscheduled time between the first appointment and the second appointment;
determining whether the amount of unscheduled time exceeds the travel time;
if it is determined that the amount of unscheduled time exceeds the travel time, reserving a time block on the calendar application to account for the travel time;
receiving a plurality of event information updates associated with the expected mode of travel, wherein the fre- quency in receiving each update of the plurality of updates increases with the approach of reserved time block;

determining a delayed travel time based on the received event information updates associated with the expected mode of travel;

determining whether the amount of unscheduled time exceeds the delayed travel time associated with the expected mode of travel; and if it is determined that the amount of unscheduled time exceeds the delayed travel time associated with the expected mode of travel, providing the event information update to the user.

2. The computer-implemented method of claim 1 wherein:
identifying the first appointment further includes identifying an ending time of the first appointment;
identifying the second appointment further includes identifying a starting time of the second appointment; and
determining the amount of unscheduled time includes subtracting the ending time of the first appointment from the starting time of the second appointment.

3. The computer-implemented method of claim 1 further comprising:
determining whether the amount of unscheduled time exceeds the travel time by more than a threshold amount; and
if it is determined that unscheduled time exceeds the travel time by more than the threshold amount, providing a message that informs a user of the unscheduled time.

4. The computer-implemented method of claim 1 further comprising:
automatically setting, without user input, a reminder for the second appointment, the reminder being set for a specified time that precedes the starting time of the second appointment time by at least the travel time to the second appointment; and
displaying a notification window at the specified time that precedes the starting time of the second appointment time by at least the travel time to the second appointment, the notification window structured and arranged to remind the user about the second appointment.

5. The computer-implemented method of claim 1 further comprising:
determining whether the travel time exceeds the amount of unscheduled time; and
if it is determined that travel time exceeds the amount of unscheduled time, providing an alert message, to inform the user that, based on the current scheduling of the first and second appointments, the user would not have enough time to arrive at the second appointment location.

6. The computer-implemented method of claim 5 further comprising providing one or more suggestions to enable the user to respond to the alert message, wherein the one or more suggestions includes a suggestion for at least one of: leave the first appointment sooner than the scheduled ending time of the first appointment, cancel, one or both of the first or second appointments, reschedule the first or second appointment, and notify the other attendees of the second appointment, or another designee, that the user will arrive late.

7. The computer-implemented method of claim 5 further comprising:
identifying people attending the second appointment;
identifying time availability of the people attending the second appointment; and
based on the time availability of the people attending the second appointment, taking steps to reschedule the second appointment at a mutually convenient time for people attending the second appointment.

8. The computer-implemented method of claim 1 wherein identifying the first appointment and the second appointment further includes:
accessing the calendar application via a navigation application in response to activation of a transferring control tool that appears within an interface of the navigation application; and
identifying the first appointment and the second appointment in the calendar application.

9. The computer-implemented method of claim 8 wherein the transferring control tool is configured to import time and geographic information of the first and second appointments to the navigation application.

10. The computer-implemented method of claim 9 wherein the transferring control is further configured to cause the navigation application to:
identify the route and the travel time associated with the route;
calculate the remaining time between the ending time of the first appointment and the starting time of the second appointment;
determine whether the remaining time exceeds the travel time; and
instruct the calendar application to place the hold between the first appointment and the second appointment to account for the travel time if it is determined the remaining time exceeds the travel time.

11. The computer-implemented method of claim 1 wherein identifying the first appointment and the second appointment further includes:
accessing the calendar application via a client device; and
identifying the first appointment and the second appointment in the calendar application.

12. The computer-implemented method of claim 11 wherein the client device interfaces between the calendar application and a navigation application.

13. The computer-implemented method of claim 11 wherein accessing the calendar application includes accessing the calendar application in response to activation of a transferring control tool within the client device that transfers control between the calendar application and the navigation application.

14. The computer-implemented method of claim 13 further comprising communicating the ending time and the geographic location of the first appointment and the starting time and the geographic location of the second appointment to the navigation application in response to the activation of the transferring control.

15. The computer-implemented method of claim 1 further comprising:
monitoring the current location of a user,
identifying a change in the current location of the user;
referencing the route extending from the geographic location of the first appointment to the geographic location of the second appointment;
determining whether the current location of the user exceeds a threshold amount from the route; and
if it is determined that the current location of the user exceeds the threshold amount from the route, providing the user with direction to the second appointment from the current location of the user.

16. A computer-implemented method for identifying a travel time between appointments, the method comprising:
identifying a first appointment in a calendar application;
identifying a time of the first appointment;

receiving, from a user, a request to schedule a second appointment at a requested time;

identifying a geographic location of the first appointment and a geographic location of the second appointment;

determining, with at least one processor, an expected mode of transportation between the geographic locations of the first and second appointments, wherein the expected mode of transportation is determined based on at least one of keywords or geographic locations associated with the first and second appointments;

identifying a route extending between the geographic location of the first appointment and the geographic location of the second appointment, based on the expected mode of transportation;

identifying a travel time associated with the route, based on the expected mode of transportation;

determining an amount of unscheduled time between the first appointment and the second appointment;

receiving a plurality of event information updates associated with the expected mode of travel, wherein the frequency in receiving each update of the plurality of updates increases with the approach of reserved time block;

determining a delayed travel time based on the received event information updates associated with the expected mode of travel;

determining whether the amount of unscheduled time exceeds the delayed travel time associated with the expected mode of travel; and if it is determined that the delayed travel time differs from the identified travel time by a threshold amount,
determining one or more alternative routes extending between the geographic location of the first appointment and the geographic location of the second appointment, wherein the one or more alternative routes is unaffected by the events associated with the received event information updates that indicated a delay in the identified travel time for the expected mode of travel, and
providing the determined one or more alternative routes to the user.

17. The computer-implemented method of claim 16 further comprising alerting the user, before scheduling the second appointment at the first particular time, about a possible conflict if it is determined that the travel time exceeds the amount of unscheduled time.

18. The computer-implemented method of claim 17 further comprising:
in response to alerting the user, receiving, from the user, a second request to schedule the second appointment at an updated requested time;
determining an amount of unscheduled time between the first appointment and the second appointment based on the updated requested time for the second appointment;
if it is determined that the amount of unscheduled time exceeds the travel time:
scheduling the second appointment at the updated requested time; and
reserving a time block on the calendar application to account for the travel time.

19. A computer-implemented method for identifying unscheduled time between two appointment entries in a calendar other than travel time and presenting options to a user for using the unscheduled time, the method comprising:
identifying at least one of a first appointment entry in a calendar associated with a user and a second appointment entry in the calendar associated with the user, the first appointment entry being associated with a first geographic location, the second appointment entry being associated with a second geographic location that is different than the first geographic location, and a starting time of the second appointment entry being subsequent to an ending time of the first appointment entry;
identifying a travel time entry corresponding to a travel time between the first geographic location associated with the first appointment entry and the second geographic location associated with the second appointment entry;
determining whether a time between the ending time of the first appointment entry and the starting time of the second appointment entry is more than a threshold greater than time required by the travel time entry; and
conditioned on determining that the time between the ending time of the first appointment entry and the starting time of the second appointment entry is more than a threshold greater than the time required by the travel time entry:
identifying unscheduled time, other than travel time, between the first appointment entry and the second appointment entry;
accessing information related to interests of the user;
receiving a geographical designation proximate to a travel route between the first geographic location and the second geographic location;
identifying one or more options for using the identified unscheduled time based on the information related to interests of the user along the travel route and within the geographical designation; and
presenting the identified one or more options to the user.

20. The computer-implemented method of claim 19 wherein:
identifying at least one of a first appointment entry in the calendar associated with the user and a second appointment entry in the calendar associated with the user includes identifying the first appointment entry in the calendar associated with the user and the second appointment entry in the calendar associated with the user; and
determining whether a time between an ending time of the first appointment entry and a starting time of the second appointment entry is more than a threshold greater than the time required by the travel time entry includes:
determining the ending time of the first appointment entry;
determining the starting time of the second appointment entry;
computing the time between the ending time of the first appointment entry and the starting time of the second appointment entry;
comparing the time between the ending time of the first appointment entry and the starting time of the second appointment entry with the time required by the travel time entry;
based on comparison results, determining whether the time between the ending time of the first appointment entry and the starting time of the second appointment entry is more than the threshold greater than the time required by the travel time entry.

21. The computer-implemented method of claim 19 wherein identifying one or more options for using the identified unscheduled time includes:
accessing information related to one or more options available for using unscheduled time;

determining a time associated with each of the one or more options based on the accessed information related to the one or more options available for using unscheduled time;

comparing the determined time associated with each of the one or more options with the identified unscheduled time;

based on comparison results, identifying options for which the determined time is less than or equal to the identified unscheduled time.

22. The computer-implemented method of claim 19 wherein:

identifying one or more options for using the identified unscheduled time includes identifying at least one of:

an option to spend more time at the first geographic location subsequent to the first appointment;

an option to spend more time at the second geographic location prior to the second appointment;

an option to visit a point of interest located proximate to the first geographic location;

an option to visit a point of interest located proximate to the second geographic location;

an option to visit a point of interest located along a route between the first geographic location and the second geographic location; and an option to reschedule at least one of the first and second appointments to minimize the identified unscheduled time.

\* \* \* \* \*

UNITED STATES PATENT AND TRADEMARK OFFICE
CERTIFICATE OF CORRECTION

| | | |
|---|---|---|
| PATENT NO. | : 8,712,810 B2 | Page 1 of 1 |
| APPLICATION NO. | : 11/966639 | |
| DATED | : April 29, 2014 | |
| INVENTOR(S) | : Meisels et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this
Eighth Day of September, 2015

Michelle K. Lee
*Director of the United States Patent and Trademark Office*